(12) United States Patent
Bajaj et al.

(10) Patent No.: US 12,126,871 B1
(45) Date of Patent: Oct. 22, 2024

(54) INTERRUPTION MODEL

(71) Applicant: Amazon Technologies, Inc., Seattle, WA (US)

(72) Inventors: Jatin Bajaj, Santa Clara, CA (US); Clare Elizabeth Veladanda, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/592,506

(22) Filed: Oct. 3, 2019

(51) Int. Cl.
| | |
|---|---|
| *H04N 21/47* | (2011.01) |
| *G10L 15/22* | (2006.01) |
| *H04N 21/43* | (2011.01) |
| *H04N 21/431* | (2011.01) |
| *H04N 21/472* | (2011.01) |

(52) U.S. Cl.
CPC ............ *H04N 21/47* (2013.01); *G10L 15/22* (2013.01); *H04N 21/4302* (2013.01); *H04N 21/4316* (2013.01); *H04N 21/47217* (2013.01); *G10L 2015/223* (2013.01)

(58) Field of Classification Search
CPC ............ H04N 21/47; H04N 21/4316; H04N 21/4302; H04N 21/47217; G10L 15/22; G10L 2015/223
USPC ............................................... 386/230
See application file for complete search history.

(56) References Cited

U.S. PATENT DOCUMENTS

| | | | |
|---|---|---|---|
| 10,516,851 B1* | 12/2019 | Eirinberg | H04L 51/046 |
| 2005/0188408 A1* | 8/2005 | Wallis | H04N 21/6587 725/86 |
| 2017/0006320 A1* | 1/2017 | Beattie, Jr. | H04N 21/2187 |
| 2018/0154232 A1* | 6/2018 | Gentil | H04N 21/21805 |
| 2018/0176639 A1* | 6/2018 | Sprenger | H04N 21/4396 |
| 2019/0320219 A1* | 10/2019 | Yoden | G06F 3/0486 |
| 2020/0021894 A1* | 1/2020 | Sanchez | G10L 15/22 |
| 2020/0184964 A1* | 6/2020 | Myers | G06F 3/165 |
| 2020/0395013 A1* | 12/2020 | Smith | G10L 15/08 |

\* cited by examiner

*Primary Examiner* — Loi H Tran
(74) *Attorney, Agent, or Firm* — K&L Gates LLP

(57) ABSTRACT

Devices and techniques are generally described for an interruption model for a user device. In various examples, first metadata related to first content executing on a user device may be determined. In some examples, second metadata related to second content for execution by the user device may be determined. In various examples, an output configuration for the user device may be determined using the first metadata and the second metadata. In some examples, the output configuration may result from identification of the second content to the user device during execution of the first content.

19 Claims, 16 Drawing Sheets

1500

|  | Music | Live News/Sports Video | Audiobook |
|---|---|---|---|
| Pausable? | Yes | No | Yes |
| Live? | No | Yes | No |
| Audio type | "Music" | "Tones/speech + tones" | "Audiobook" |
| Visual type | "Visual support" (album art) | "Visually dominant" | "None" |
| Lead-in? | No | No | No |
| Multiple instance support? | No | No | No |
| ⋮ |  |  |  |

FIG. 15

INTERRUPTION MODEL

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wake-word". Natural language processing is used to translate the spoken requests into semantic interpretations of the spoken command. Executable instructions are generated based on the semantic interpretation of the spoken command. The executable instructions are executed and a corresponding task is performed. Such speech processing and voice control may be used as a control interface for personal computers, hand-held devices, telephone computer systems, and a wide variety of other computing devices to improve human-computer interactions. In various examples, speech processing-enabled devices may comprise or may be configured in communication with displays for showing images and video and/or speakers for outputting audio.

BRIEF DESCRIPTION OF DRAWINGS

FIG. 15 depicts a table illustrating example content along with example attributes, in accordance with some aspects of the present disclosure.

DETAILED DESCRIPTION

Figure 1:
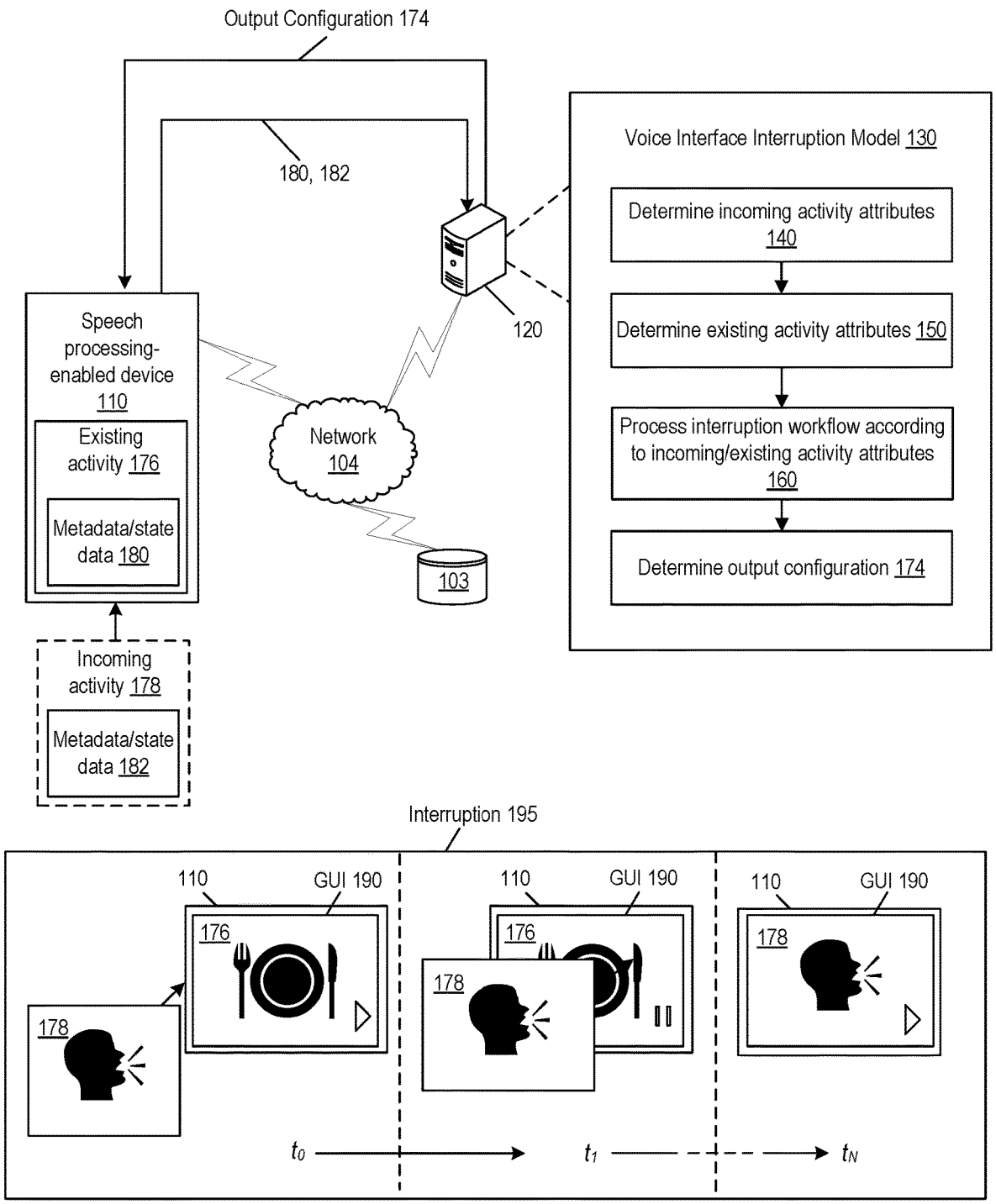
FIG. 1 is a diagram of an example speech processing system including a voice interface interruption model, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Computing devices, such as smart home assistants, smart speakers, and/or other devices, may be used to perform a variety of actions. For example, many smart home assistants play music, video, speech (e.g., reading aloud the weather forecast, news, answering questions, etc.), control other devices (e.g., security systems, lighting, thermostats, etc.), play audible alarms, conduct voice calling and/or video calling, etc. The voice interface interruption model described herein may define the resulting experience when two actions intersect (e.g., when a device receives an instruction to perform an incoming action while the device is already performing an existing action). The voice interface interruption model may determine an output configuration that instructs the local speech processing-enabled device to output content in the audio and/or visual channel in accordance with the determined interruption result. For example, the voice interface interruption model described herein may define what happens when a device is playing music and an incoming video call is received by the device. An interrupting action (e.g., an incoming action) may be invoked by user input (e.g., a touch command received via a button or touch screen display of the device, a voice command spoken to the device, etc.) and/or can be invoked via incoming content that is triggered based on some other event (e.g., a device that is scheduled to read the current news whenever the presence of a user is detected) and/or is scheduled (e.g., reading the weather forecast at 8:00 am each weekday). In some examples, incoming actions may be invoked by other users (e.g., a voice or video call from another user) apart from a user that is physically proximate to the device.

Although resolution of conflicting actions are known (e.g., receiving an incoming call on a mobile phone while the user is reading an email on the smart phone), the voice interface interruption model described herein may be specifically useful for devices in which a voice interface is a primary mode of user interaction. Additionally, although the various computer-implemented workflows described herein provide priority to various actions over other actions, the voice interface interruption models described herein may be configured to allow the user to maintain control of the current action by overriding output configurations determined by the interruption model where desired. For example, if the voice interface interruption model pauses playback of a video in favor of an incoming audio action, the user may override the interruption and may continue to play the video, as desired. The various computer-implemented workflows described herein comprise a number of logically-connected decision steps that are evaluated using attribute values encoded in metadata of the incoming and existing content. Ultimately, each logical path of a workflow may lead to a result in an output configuration of the device for which the interruption modality is being determined. For example, a first decision step in a workflow may make a determination as to whether or not existing audio content is pausable. The interruption model may perform a check of metadata associated with the audio content to determine whether or not the audio content is pausable. The determination that the audio content is pausable may lead to one processing path of the workflow while the determination that the audio content is not pausable may lead to a different processing path of the workflow. Accordingly, as shown in FIGS. 4-13 the various workflows may be parsed by using the metadata of the incoming and existing content at each decision step of the workflow to make a determination as to the output path from that decision step for the particular interruption being evaluated.

One approach for determining the experience resulting from an interrupting action may be to determine broad categories for actions. Thereafter, a static decision matrix may be used to determine the resulting action. For example, existing-activity categories may be listed for each column of the matrix and incoming-activity categories may be listed for each row of the matrix. Thereafter, when an incoming activity is received during an existing activity, the resulting experience may be determined by finding the intersection of the existing activity category and the incoming activity category on the decision matrix.

In various examples, the voice interface interruption models described herein may consider the device ecosystem (e.g., all relevant devices on the LAN) and may decide the relevant devices to which to deliver the action and/or may determine the appropriate transition from one experience to another experience based on the device ecosystem.

In various examples, the voice interface interruption models described herein may be deployed as cloud-based service(s) that may communicate with one or more speech processing-enabled devices (e.g., user devices). Accordingly, the voice interface interruption model may consider all relevant devices (e.g., all the devices communicating on a user's LAN) prior to determining whether to interrupt existing activities and/or on what devices to interrupt existing activities (as well as how to interrupt the existing activities). In some cases, the decision of where to send the interrupting activity (e.g., to which device) may be made based on the intended recipient's presence and/or location, the intended recipient's current interactions with one or more devices, and/or the priority of the incoming activity.

In at least some examples, the voice interface interruption models and/or some interruption workflows thereof may be executed locally by a user device (e.g., a speech processing-enabled device). For example, interruption experiences related to wakeword detection, touchscreen inputs, Bluetooth (and/or other short-range communication technologies), may be processed locally on the user device to increase responsiveness and/or reduce latency. In some further examples, various types of acoustic events may be processed locally such as security-related events (e.g., smoke alarm signals, carbon monoxide detection signals, glass-break acoustic events). In some cases, events that are sensitive to latency (such as the safety-related and/or security-related events previously mentioned) may be processed locally by interruption workflows stored within a memory of a user device, while other, less-sensitive interruptions (e.g., music interrupting a movie) may be processed by interruption workflows stored and/or executed using back-end systems (e.g., a cloud-based voice interruption model). Accordingly, the various interruption models described herein may be deployed locally at a user device, on a back-end system communicating over a network with the user device, and/or by some combination of local and back-end devices.

The voice interface interruption models described herein may use attributes of the existing and incoming content to determine an interruption modality, rather than determining an interruption modality based on broad categories of the incoming and existing content.

In an example, an instructional video, such as a cooking video, may include spoken instructions along with one or more videos showing an example of a person carrying out the spoken instructions. In this example, the spoken instructions pause while after each step, while the video continues to show an example of the step being performed. For example, the spoken instruction may be instructions describing mincing an onion while the video is a loop of a person mincing an onion. The spoken instructions are not synchronized with the video and may therefore pause to provide the user an opportunity to mince the onion while watching the video. Thereafter the user provides a continue instruction (either through a spoken command or through an interface of the user device outputting the content) that causes the next spoken instruction and/or video to play. In the foregoing example, the user may request music to play while watching the cooking instructional video. Although it is possible to play the music in the background while displaying the video portions and to attenuate the music to a lower volume during spoken portions of the video, previous category-based approaches may define such an intersection of incoming and existing content as "music interrupting video" and may pause the video. This may be a typical approach as a person watching a movie would normally not want music to play simultaneously. Accordingly, in some approaches, the user may be unable to continue the cooking instructional video and simultaneously listen to music. However, the voice interface interruption model described herein may determine the interruption experience based on the attributes of the content rather than based on broad categories of the content. Accordingly, using the example above, the voice interface interruption model may determine metadata indicating attributes of the existing content and the incoming content. For example, the voice interface interruption model may determine that the existing content includes metadata indicating that the content is not live content, metadata indicating that the existing content is not the same as the incoming content, metadata indicating a visual type of the existing content, metadata indicating that the existing content is pausable, etc. The voice interface interruption model may parse the workflows described below in reference to FIGS. 4-13 to determine an output configuration that continues the existing content (the instructional video) and plays the incoming music (for example).

Storage and/or use of data related to a particular person or device may be controlled by a user using privacy setting(s) associated with a speech processing-enabled device and/or a companion application associated with a speech processing-enabled device. Accordingly, users may opt out of storage and/or usage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not technically subject to them, to bolster user trust. For example, data may be treated as if it fell under acts and regulations, such as the Health Insurance Portability and Accountability Act (HIPAA) and the General Data Protection Regulation (GDPR), even if it does not actually fall under these acts and regulations. In various examples, collection, use, and/or storage of data described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

Instead of determining and/or approximating categories of incoming and existing activities, the voice interface interruption models described herein may determine an interruption modality using the attributes of both the incoming and existing activities. The various workflows of the voice interface interruption models described herein may be used to determine what happens when two different user experiences collide rather than making a static determination based on activity categories. For example, instead of determining what happens on a smart home device when an incoming voice call (a first activity category) intersects (in time) with a playing alarm (a second activity category), the voice interface interruption model approaches described herein may break the activities (incoming voice call and alarm) into representative functional components or other type of attributes, and use those attributes to determine what happens. For example, the response can be determined by processing an incoming activity that comprises speech mixed with tones (e.g., the incoming voice call playing a ring tone and announcing "Call from Andrea") that interrupts an activity that comprises tones (e.g., an alarm sound). In the foregoing example, speech, tones, and the mixing thereof are attributes of the activities themselves rather than being a category of the activities. Determining an interruption modality may comprise determining an output configuration for a speech processing-enabled device when incoming content is sent to the device for execution while the device is executing existing content. An output configuration may define the output of the speech processing-enabled device as a result of the interruption. For example, the various results determined by parsing the workflows depicted in FIGS. 4-13 may be part of the output configuration sent to the speech processing-enabled device. Data specifying the interruption modality may be sent to the one or more speech processing-enabled devices experiencing the interruption and/or receiving the incoming content. Data specifying an interruption modality may include instructions to configure audio output and/or visual output for the one or more speech processing-enabled devices. For example, data specifying an interruption modality may include instructions to cause the speech processing-enabled device to pause existing audio and video in favor of incoming audio and/or video.

In various examples, the workflows of the voice interface interruption models described herein may be implemented as computer-executable instructions that, when executed by at least one processor, are effective to cause the at least one processor to perform the various techniques described herein. Additionally, in some examples, the various workflows may be implemented as a wizard (e.g., a computer-based user interface that leads a user through a set of steps to determine a configuration) so that application developers can determine the experiences that may result from an interruption (e.g., either when an activity of the application causes the interruption or is interrupted by various different types of content) when designing and/or deploying the applications.

FIG. 1 is a diagram of an example speech processing system including a voice interface interruption model, according to various embodiments of the present disclosure.

A speech processing-enabled device 110 may be configured in communication with a back-end speech processing system (e.g., speech processing computing device(s) 120), at least one non-transitory computer-readable memory 103, and/or a voice interface interruption model 130. In various examples, a speech processing-enabled device 110 may be any computing device with a voice interface that may be used to interact with and/or control operation of the device. For example, a computing device employing a smart home assistant (sometimes referred to as a "virtual assistant") may be an example of speech processing-enabled device 110. In various other examples, speech processing-enabled device 110 may be a computing device comprising at least one processor that may include speech processing functionality (described below in reference to FIG. 3). In some examples, speech processing-enabled device 110 may communicate over network 104 with a back-end speech processing system (e.g., speech processing computing device(s) 120). In some examples, speech processing computing device(s) 120 may perform additional speech processing beyond the speech processing performed locally by speech processing-enabled device 110. For example, speech processing computing device(s) 120 may represent a cloud-based speech processing service used to process audio data sent over network 104 by speech processing-enabled device 110. Network 104 may be a LAN and/or a wide area network, such as the internet.

Voice interface interruption model 130 may be implemented by one or more computing devices that determines an interruption modality for speech processing-enabled device 110 when an incoming activity is received while an existing activity is being executed by the speech processing-enabled device 110. In various examples, voice interface interruption model 130 may be implemented as software executed by speech processing computing device(s) 120. In some other examples, voice interface interruption model 130 may be implemented using separate hardware. Voice interface interruption model 130 may communicate with speech processing computing device(s) 120 and/or with speech processing-enabled device(s) 110 to determine the appropriate interruption modality. Additionally, in various examples where there are multiple speech processing-enabled device(s) 110, voice interface interruption model 130 may determine the appropriate devices to which to send an incoming service and how to interrupt any existing activity on those devices. As previously described, voice interface interruption model 130 may be implemented at a local device (e.g., speech processing-enabled device 110), a remote back-end device (e.g., speech processing computing device(s) 120 and/or other computing device(s) remotely located relative to speech processing-enabled device 110)) and/or by some combination thereof.

In various examples, speech processing-enabled device 110 may be executing an existing activity 176 (e.g., music, TTS output, a movie, an instructional video, a display of a photo album, etc.). The existing activity 176 may comprise metadata/state data 180. The metadata of metadata/state data 180 may include data describing the attributes of the existing activity 176. For example, if the existing activity is a live sports video, the metadata may indicate that the existing activity 176 is of a visual type "visually dominant," that the video is live, that the video is not pausable, that multiple instances of the video are not supported for playback, etc. State data of metadata/state data 180 may indicate resources being consumed by the existing activity 176. For example, state data may indicate resources of speech processing-enabled device 110 that are consumed by the existing activity 176 (e.g., CPU cycles, audio drivers, display drivers, memory, and/or other state data describing a current state of speech processing-enabled device 110 etc.). As described above, in some examples, metadata may explicitly identify the attributes associated with the incoming and/or existing activities.

Similarly, incoming activity 178 may be an activity that has been requested by a user of speech processing-enabled device 110, a scheduled activity for execution by speech processing-enabled device 110, etc. Incoming activity 178 may include metadata/state data 182, which may be similar to the metadata/state data 180 described above, albeit related to incoming activity 178.

Voice interface interruption model 130 may receive the metadata/state data 180, 182 from speech processing-enabled device 110 and may determine incoming activity attributes (140) of the incoming activity using the metadata. Additionally, voice interruption model 130 may determine existing activity attributes (150). Generally, attributes may comprise whether the activity comprises audio, whether the activity comprises a visual component, the type audio, the type of visual component, whether the activity is related to wakeword triggering of the speech processing system, whether the incoming and existing activities are mixable with one another, whether the existing activity is pausable, whether the incoming content is live (e.g., a voice call or video call, a live event notification, etc.), etc. The various attributes are discussed in further detail in the workflows described in FIGS. 2 and 4-13.

Voice interface interruption model 130 may process the interruption workflow (160) using the incoming activity attributes determined at 140 and the existing activity attributes determined at 150. Processing the interruption workflow (160) may comprise parsing the workflow according to the incoming activity attributes determined at 140 and the existing activity attributes determined at 150. Various example interruption workflows are described in FIGS. 2 and 4-13. The interruption workflows may be implemented as a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure. After processing the various workflows according to the activity attributes of the incoming and existing activities, voice interface interruption model 130 may determine an output configuration (174). The output configuration may be effective to configure speech processing-enabled device 110 according to an interruption modality determined as a result of the incoming activity 178 interrupting (in time) the existing activity 176. The output configuration 174 may determine the resulting experience from the "collision" of the existing and incoming activities. The output configuration 174 may comprise non-transitory computer-readable instructions effective to control output of audio, graphics, indicator lights, etc., by the speech processing-enabled device 110. The output configuration 174 may comprise an audio output configuration controlling audio output of the speech processing-enabled device 110 following the interruption. For example, FIGS. 5-8 and the descriptions thereof may represent an audio workflow that may be used to determine an audio output configuration when incoming content is received while speech processing-enabled device 110 is executing existing content. Similarly, the output configuration 174 may comprise a visual output configuration controlling visual output of the speech processing-enabled device 110 following the interruption. For example, FIGS. 9-12, and the descriptions thereof, may represent a visual workflow that may be used to determine a visual output configuration when incoming content is received while speech processing-enabled device 110 is executing existing content.

An example interruption flow 195 is depicted in FIG. 1, wherein a graphical display of incoming activity 178 (e.g., a video call) replaces a graphical display of existing activity 176 (e.g., a cooking video) on a graphical user interface 190 (GUI) of the speech processing-enabled device 110 (e.g., according to the output configuration 174). In the example interruption flow 195, the graphical display of incoming activity 178 is received to replace the graphical display of existing activity 176 at time $t_0$. At time $t_N$ the graphical display of the incoming activity 178 has replaced the graphical display of the existing activity 176 on the GUI 190 of the speech processing-enabled device 110. In some examples, the graphical display of the existing activity may be paused or stopped, according to the particular output configuration 174 determined for the existing activity 176 and the incoming activity 178. Additionally, it should be understood that the example interruption flow 195 is merely an example of an interruption scenario in which incoming content with a visual component (e.g., a graphical display) intersects, in time, with an existing activity with a visual component. In other examples, the graphical display of the incoming activity 178 may be displayed on a first portion of a graphical display while playback/output of the existing content may be continued on the graphical display. For example, the incoming content may be displayed as a banner, as a pop-up window, as a partially transparent overlay, a picture-in-picture (PIP), etc. Additionally, the various interruption workflows described herein may determine the output configuration of speech processing-enabled device 110 for audio, indicator lights, and/or other output channels of speech processing-enabled device 110 beyond the visual interruption depicted in example interruption flow 195.

In the example interruption flow 195, metadata/state data 180 of existing activity may indicate that the existing activity 176 may be of the visual type "video," and that the existing activity 176 may be pausable. Accordingly, in the example interruption flow 195 the graphical display of existing activity 176 is depicted as playing at time to and is paused at time 11, just as the incoming activity 178 is about to be displayed. At time IN, the display of the incoming activity 178 is initiated, while the existing activity 176 remains paused in the background. It should be understood that the particular metadata/state data 182 of the incoming activity 178 and metadata/state data 180 of the existing activity 176 are used to determine the particular output configuration 174, and that the interruption flow 195 is merely an example of one possible output configuration for a GUI 190 of an example speech processing-enabled device 110.

Figure 2:
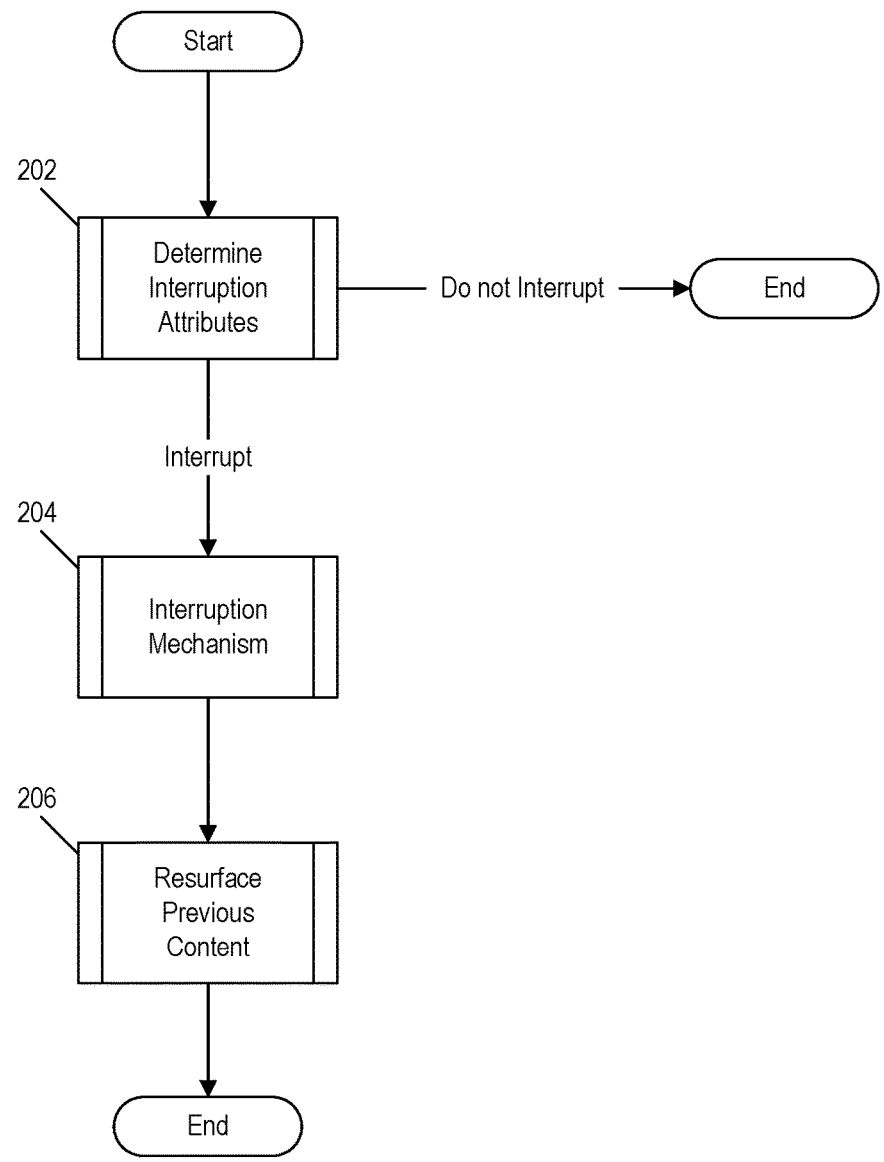
FIG. 2 is a flowchart illustrating an example process that may be used to determine whether and how to interrupt an existing activity with an incoming activity, according to various embodiments of the present disclosure.

FIG. 2 is a flowchart illustrating an example workflow that may be used to determine whether and how to interrupt an existing activity with an incoming activity, according to various embodiments of the present disclosure. At action 202, the incoming and existing activity attributes may be determined and a decision may be made, using the workflows described in FIGS. 4-13, as to whether to interrupt the existing activity with the incoming activity. If a determination is made at action 202 that the existing activity should not be interrupted, processing may end. Conversely, if a decision is made at action 202 that the existing activity should be interrupted, processing may proceed to action 204.

At action 204, the mechanism for interrupting may be determined. For example, a determination may be made whether the incoming content should be displayed as a banner over the existing content, etc. In various examples, after the incoming content has been output by the speech processing-enabled device(s) 110, processing may continue to action 206. At action 206, the interrupted content (e.g., the existing content-prior to the interruption) may be resurfaced. For example, if the existing content is a song that is interrupted by an incoming voice call, the song may be paused by voice interface interruption model 130 when the incoming call is received. At the conclusion of the call, the song may be resumed. In various examples, workflow 206 may determine how previous content (e.g., existing content previously interrupted by incoming content) is (or is not) resurfaced after the incoming content is received. Action 206 may be performed by a separate system/systems apart from those described here.

Figure 3:
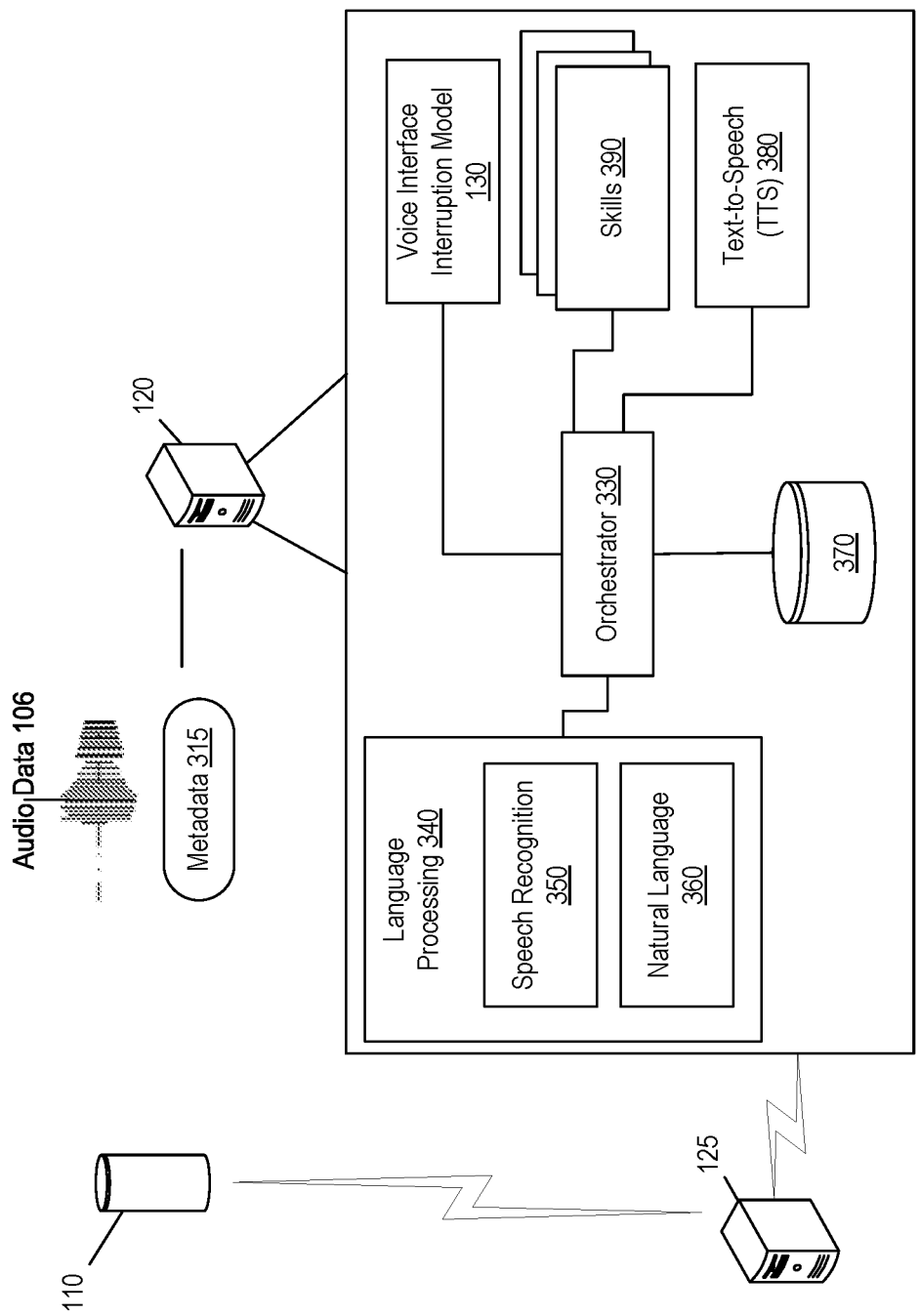
FIG. 3 is a conceptual diagram of components of a speech processing system according to various embodiments of the present disclosure.

FIG. 3 is a conceptual diagram of components of a speech processing system according to various embodiments of the present disclosure. As shown, the speech processing system may be implemented by speech processing computing device(s) 120, speech processing-enabled device 110, skill computing device(s) 125, and/or some combination thereof.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance.

Speech processing may be used in a variety of contexts, including in speech processing-enabled devices (e.g., devices employing voice control and/or speech processing "personal assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, voice-enabled skills invoked by the Alexa system from Amazon.com, Inc. of Seattle, Washington, etc.

Speech processing-enabled device(s) 110 may include microphones (e.g., far-field microphone arrays) used to transform audio into electrical signals. Speech processing may then be performed, either locally by the speech processing-enabled device(s) 110, by one or more other computing devices communicating with the speech processing-enabled device(s) 110 over a network (e.g., speech processing computing device(s) 120), or by some combination of the speech processing-enabled device 110 and the one or more other computing devices. In various examples, speech processing-enabled device(s) 110 may include and/or may be configured in communication with speakers and/or displays effective to output information obtained in response to a user's spoken request or command, or to output content that may be of interest to one or more users. As used herein, a display of speech processing-enabled device(s) 110 refers to a display effective to output graphics such as images and/or video. Further, as used herein, a displayless device refers to a device that does not include a display that is effective to render graphical images or text.

A speech-controlled computing system may respond to user utterances by outputting content and/or performing one or more other actions, such as playing music, providing information, calling a taxi, displaying an image, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by an outside developer that is different relative to a developer of the herein-disclosed speech processing system, without the outside developer provisioning or managing one or more servers for executing the skill. In such an implementation, the system may be triggered to run a skill in response to the outside developer calling the system via the Internet or a mobile application. Such implementation may include, but is not limited to, Amazon's AWS Lambda.

Figure 14A:
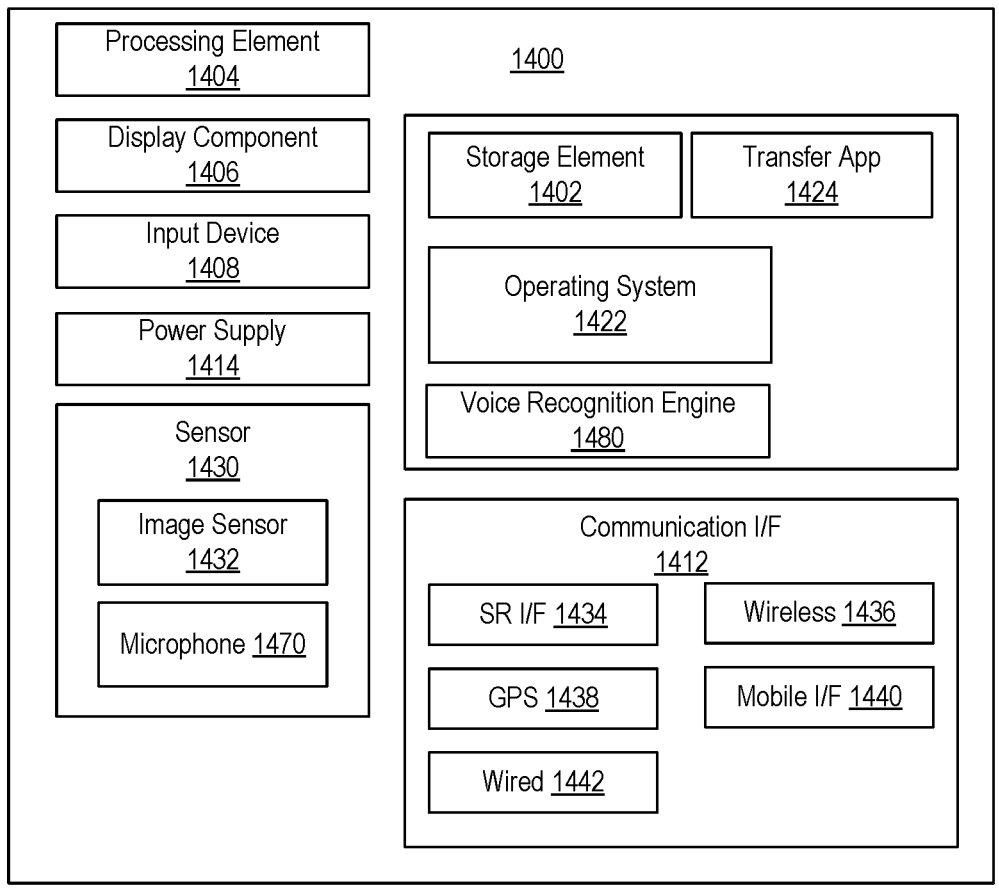
FIGS. 14A-14B are block diagrams showing example architectures of computing devices that may be used in accordance with various embodiments described herein.

A system according to the present disclosure may operate using various components as described in FIG. 3. The various components illustrated FIG. 3 may be located on the same or different physical devices. Communication between various components illustrated in FIG. 3 may occur directly or across a network 104. The speech processing-enabled device(s) 110 may capture audio using an audio capture component, such as the microphone(s) 1470 (FIG. 14A). The speech processing-enabled device(s) 110 may send audio data 106 (e.g., representing a spoken user request), corresponding to spoken audio, to the speech processing computing device(s) 120. The speech processing-enabled device(s) 110 may include a wakeword detection component that detects when input audio includes a spoken wakeword. In some instances, the speech processing-enabled device(s) 110 may be configured to send audio data 106 to the speech processing computing device(s) 120 when the speech processing-enabled device(s) 110 detects a spoken wakeword. The speech processing-enabled device(s) 110 may also send metadata 315 (e.g., including encoded states of speech processing-enabled device(s) 110, existing activity attributes, data describing resources being used by an existing activity, timestamp data, etc.) to the speech processing computing device(s) 120. The metadata 315 may be created by a computing component of the speech processing-enabled device(s) 110.

Upon receipt by the speech processing computing device(s) 120, the audio data 106 may be sent to an orchestrator 330. The orchestrator 330 may include memory and logic that enables the orchestrator 330 to transmit various pieces and forms of data to various components of the system. In various examples, orchestrator 330 may be configured in communication with computing device(s) 102 and voice interface interruption model 130. In various examples, orchestrator 330 may send state data received from speech processing-enabled device 110 to voice interface interruption model 130. As previously described, the state data may include data indicating incoming and/or existing activity attributes, and/or may include data describing resources of speech processing-enabled device 110 being used by the incoming and/or existing activities. In examples where voice interface interruption model 130 receives state data and/or resource usage data from speech processing-enabled device 110 (rather than data explicitly identifying the activity attributes), voice interruption model 130 may determine the incoming and/or existing activity attributes using the state data and/or resource usage data.

The orchestrator 330 may send the audio data 106 to a language processing component 340. An ASR component 350 (e.g., a speech recognition component) of the language processing component 340 transcribes the audio data 106 into one or more hypotheses representing speech contained in the audio data 106. The ASR component 350 interprets the speech in the audio data based on a similarity between the characteristics of the audio data corresponding to the speech and pre-established language models. For example, the ASR component 350 may compare the audio data 106 with models for sounds (e.g., subword units such as phonemes) and sequences of sounds to identify words that match the sequence of sounds in the speech represented in the audio data 106. The ASR component 350 may send text data generated thereby to a Natural language component 360 of the language processing component 340. The text data output by the ASR component 350 may include a top scoring hypothesis of the speech represented in the audio data 106 or may include an N-best list including a group of hypotheses of the speech represented in the audio data 106, and potentially respective scores ASR processing confidence scores.

The natural language component 360 attempts to make a semantic interpretation of the phrases or statements represented in the text data input therein. That is, the natural language component 360 determines one or more meanings associated with the phrases or statements represented in the text data based on individual words represented in the text data. The natural language component 360 interprets a text string to derive an intent of the user (e.g., an action that the user desires be performed) as well as pertinent pieces of information in the text data that allow a device (e.g., the speech processing computing device(s) 120, the skill computing device(s) 125, etc.) to complete the intent. For example, if the text data corresponds to "Play the new album by [Musical_Artist]", the natural language component 360 may determine the user intended to invoke a music playback intent with to play the relevant album. In various examples, the metadata 315 may be an indication of data displayed and/or output by speech processing-enabled device(s) 110 and/or data related to a current device state of speech processing-enabled device(s) 110. Accordingly, the metadata 315 may be provided to voice interface interruption model 130. In various examples, skills 390 (e.g., executed by skill computing device(s) 125 and/or by speech processing-enabled device 110) may send metadata to voice interface interruption model 130 to enable voice interface interruption model 130 to determine activity attributes associated with execution of the skill.

The speech processing computing device(s) 120 may include a profile storage 370. The profile storage 370 may include a variety of information related to individual users, groups of users, etc. that interact with the system. The user profile storage 370 may include one or more profiles. Each profile may be associated with a different identifier (ID), such as an identifier of speech processing-enabled device(s) 110. A profile may be an umbrella profile specific to a group of users. That is, a profile encompasses two or more individual user profiles, each associated with a respective unique user ID. For example, a profile may be a household profile that encompasses user profiles associated with multiple users of a single household. Similarly, a profile may be associated with two or more users of a household and other speech processing-enabled devices of those users. A profile may include preferences shared by all the user profiles encompassed thereby. Each user profile encompassed under a single profile may include preferences specific to the user associated therewith. That is, each user profile may include preferences unique from one or more other user profiles encompassed by the same profile. A user profile may be a stand-alone profile or may be encompassed under a customer profile. As illustrated, the user profile storage 370 is implemented as part of the speech processing computing device(s) 120. However, it should be appreciated that the user profile storage 370 may be located proximate to the speech processing computing device(s) 120, or may otherwise be in communication with the speech processing computing device(s) 120, for example over the network(s) 104. In various examples, the profiles may be used by voice interface interruption model 130 to determine the particular speech processing-enabled devices 110 on which an incoming activity should be deployed based on the activity attributes and/or based on profile preferences. In various examples, incoming activities may be deployed on a device based on a determination that a user is currently interacting with that device. In another example, an incoming activity may be deployed on a device based on a determination that a user is physically proximate to that device (e.g., relative to other devices in the user's home).

The speech processing computing device(s) 120 may include one or more skills 390 configured to perform the various techniques herein disclosed, such as the existing and/or incoming activities described herein. The speech processing computing device(s) 120 may also be in communication with one or more skill computing device(s) 125 that execute one or more skills configured to perform the herein disclosed, as well as other, processes. To enable a skill 390 to execute, orchestrator 330 may send output from the Natural language component 360 (e.g., text data including tags attributing meaning to the words and phrases represented in the text data), and optionally output from the profile storage 370 to the skill 390.

The speech processing computing device(s) 120 may also include a TTS component 380 that synthesizes speech (e.g., generates audio data) corresponding to text data input therein. The TTS component 380 may perform speech synthesis using one or more different methods. In one method of synthesis called unit selection, the TTS component 380 matches text data against one or more databases of recorded speech. Matching units are selected and concatenated together to form audio data. In another method of synthesis called parametric synthesis, the TTS component 380 varies parameters such as frequency, volume, and noise to create an artificial speech waveform output. Parametric synthesis uses a computerized voice generator, sometimes called a vocoder.

The various components (330/340/350/360/380/390/130) described above may exist in software, hardware, firmware, or some combination thereof.

The speech processing computing device(s) 120 may reside on speech processing-enabled device(s) 110, in a cloud computing environment, or some combination thereof. For example, the speech processing-enabled device(s) 110 may include computing equipment, some portion of which is configured with all/some of the components/functionality of speech processing computing device(s) 120 and another portion of which is configured with all/some of the components/functionality of computing device(s) 102. The speech processing-enabled device(s) 110 may then perform a variety of functions on its own (such as when remote communications are unavailable), and/or may communicate (when capable) with computing device(s) 102 and/or the speech processing computing device(s) 120 to perform other functions. Alternatively, all of the functionality may reside on the speech processing-enabled device(s) 110 or remotely.

Figure 4:
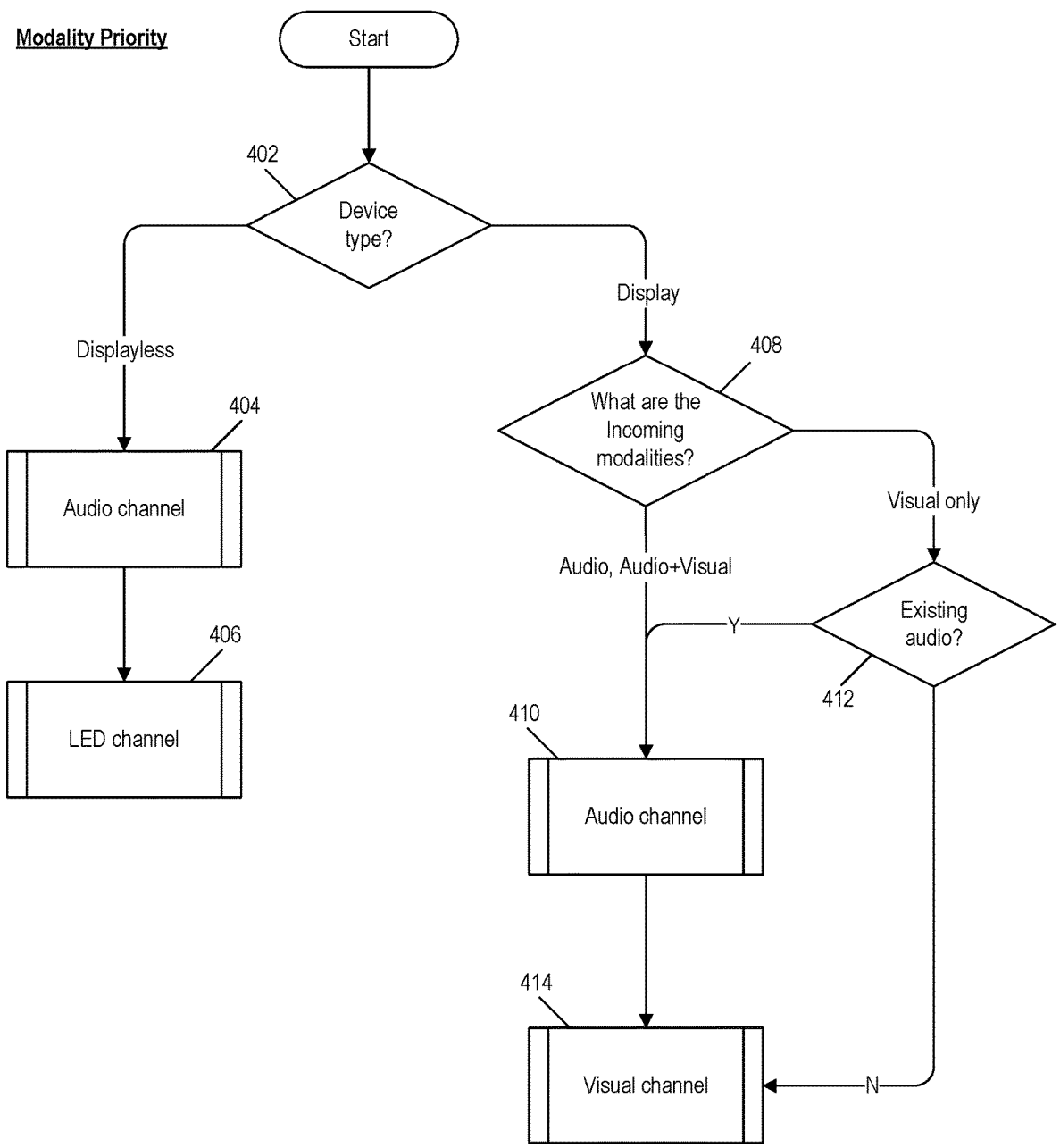
FIG. 4 is a flowchart illustrating an example process that may be used to determine an interruption modality, in accordance with various aspects of the present disclosure.

FIG. 4 is a flowchart illustrating an example process that may be used to determine an interruption modality, in accordance with various aspects of the present disclosure. The processing described in FIG. 4 may represent a workflow that may be used to determine an interruption modality that may in turn be used to determine incoming and existing activity attributes of content in order to determine the resultant interruption experience for the speech processing-enabled device 110.

At action 402, a determination may be made as to a type of the particular speech processing-enabled device 110. The type data indicating the type of the device may be provided to the voice interface interruption model 130 by metadata sent from the speech processing-enabled device 110 (e.g., device identifier data). In various examples, the type data may indicate and/or may be used by voice interface interruption model 130 to determine whether the speech processing-enabled device 110 comprises a display (e.g., a device including a display with a plurality of addressable pixels effective to output graphical images or text) or whether the speech processing-enabled device 110 is displayless.

If the speech processing-enabled device 110 is displayless, processing may proceed (404) to the audio channel workflow described below in reference to FIG. 5. In some examples, following processing of the audio channel workflow, processing may proceed (406) to an LED channel workflow. For example, the speech processing-enabled device 110 may include an LED indicator light or lights that may be used to signal incoming and/or existing content to a user. For example, some speech processing-enabled device 110 may include a light ring that may light up to indicate various incoming actions.

If the speech processing-enabled device 110 includes a display, a determination may be made as to the modalities of the incoming content (408). Modalities of content may indicate what perceivable attributes are associated with the content. For example, a determination may be made whether the content is visual only (and thus does not include any audio) or whether the content is either audio-only or audio along with visual content. If the incoming content is audio only or audio along with visual content, processing may proceed (410) to the audio channel workflow described below in reference to FIG. 5 followed by (414) the visual channel workflow described below in reference to FIG. 9. If the incoming content is visual only a determination may be made if existing content being executed by the speech processing-enabled device 110 includes audio (412). If so, processing may proceed (410) to the audio channel workflow described below in reference to FIG. 5 followed by (414) the visual channel workflow described below in reference to FIG. 9. If not, processing may proceed to the visual channel workflow described below in reference to FIG. 9 and may skip the audio channel processing.

Figure 5:
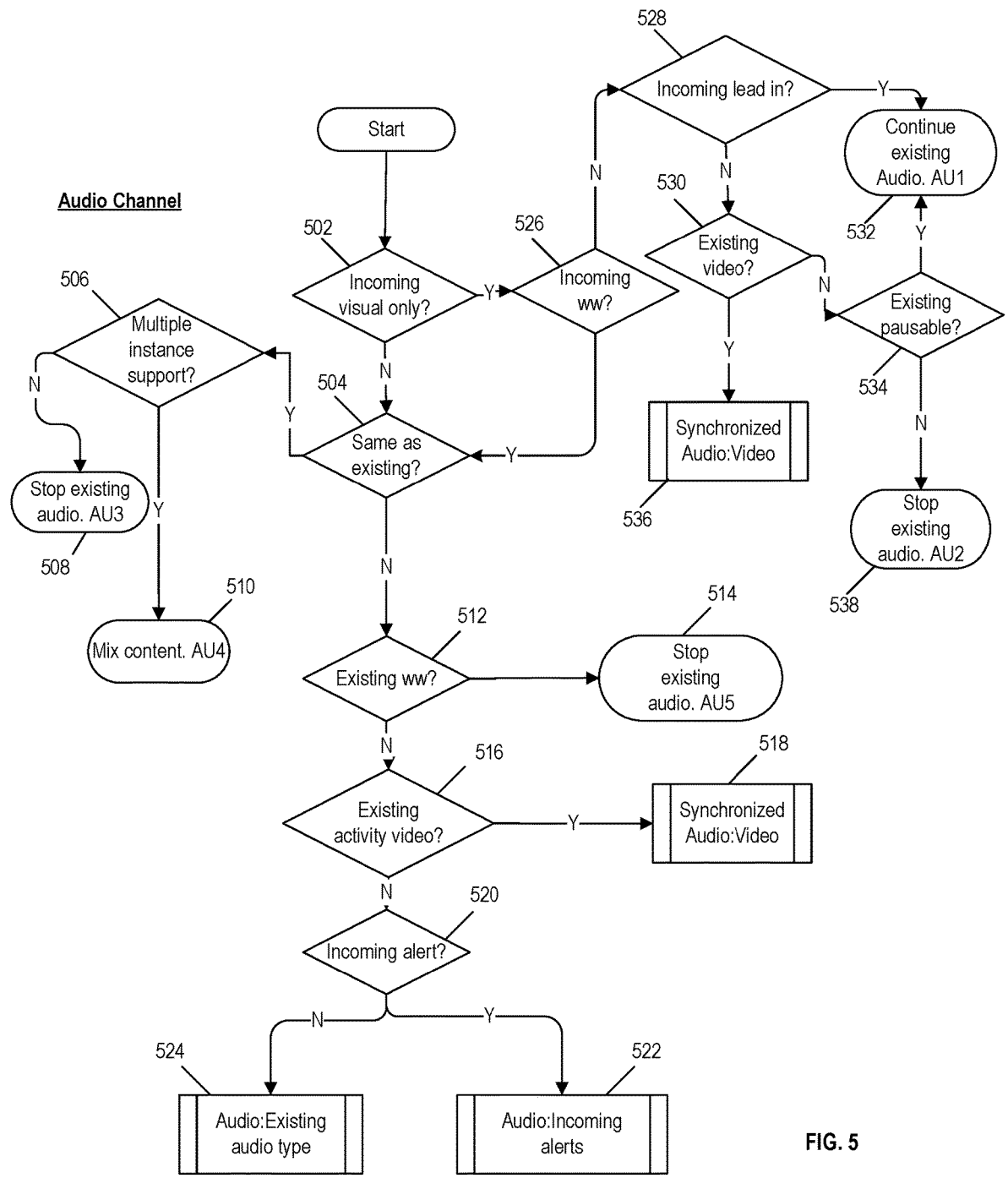
FIG. 5 is a flowchart illustrating an example process for evaluating the audio channel attributes of incoming and existing activities, in accordance with various aspects of the present disclosure.

FIG. 5 is a flowchart illustrating an example process for evaluating the audio channel attributes of incoming and existing activities, in accordance with various aspects of the present disclosure. A determination may be made (502) whether the incoming content is visual only. Examples of visual only content may be content that comprises only a visual component (e.g., viewing a picture album and/or a website). If the incoming content is not visual only a determination may be made (504) if the incoming content is the same as the existing content. If the incoming content is the same as the existing content, a determination may be made (506) whether there is multiple instance support (e.g., whether both the incoming and existing content may be output by speech processing-enabled device 110 simultaneously). If not, final audio result AU3 is determined (508), wherein the existing audio is stopped in favor of the incoming content and audio. If multiple instances are supported, final audio result AU4 is determined (510), wherein the incoming content is mixed with the existing content. In various examples, an audible signal (e.g., a tone, chime, or the like) may be played to indicate that incoming content is being output along with the existing content.

If the incoming content is not the same as the existing content (504) a determination is made (512) whether the existing content comprises wakeword-related content. Wakeword related content may be, for example, content related to processing of speech, recording of user speech (e.g., recording and/or streaming user speech following wakeword detection), outputting audio and/or visual data in response to detection of a wakeword (e.g., "Yes. How can I assist you?"), or the like. If the existing content comprises wakeword-related content, final audio result AU5 may be determined (514), wherein the existing audio is stopped in favor of the incoming audio.

If the existing content does not comprise wakeword-related content, a determination may be made (516) whether the existing activity is video with synchronized audio (e.g., a movie, a video call, etc.). If the existing activity is video with synchronized audio, processing may continue (518) to the synchronized audio:video workflow described below in reference to FIG. 6. If the existing activity is not video with synchronized audio, a determination may be made (520) whether the incoming audio is an alert (e.g., emergency information, an incoming voice or video call, a scheduled alarm, etc.). If so, processing may continue (522) to the audio:incoming alerts workflow described below in reference to FIG. 7. If not, processing may continue (524) to the audio:existing audio type workflow described below in reference to FIG. 8.

If a determination is made (502) that the incoming content is visual-only in nature (e.g., the display of photographs without sound, display of text, display of a website without sound, etc.), a determination may be made whether the incoming content is wakeword-related. If so, processing may return to (504) (described above). If the incoming content is not wakeword-related, a determination may be made whether the incoming content is lead-in content. Lead-in content comprises content that is a lead-in to other content. For example, if a user requests that a movie be played, the speech processing-enabled device may respond "OK, playing the movie in 5 . . . 4 . . . 3 . . . 2 . . . 1." In some other examples, an audio cue may be used to signal incoming content. Such audio may be examples of lead-in content. In general, any content that is only played as a precursor and/or introduction to other content may be identified as lead-in content. In various examples, metadata identifying lead-in content as such may be received from either the skill generating the content, speech processing computing device(s) 120, and/or speech processing-enabled device 110.

If the incoming content is classified as visual only (502) a determination is made (526) whether the existing content comprises wakeword-related content. If the incoming content comprises wakeword-related content, processing may return to (504), described above. If the incoming content is not wakeword-related, processing may continue to (528) at which a determination may be made whether the incoming content is lead-in content.

If the incoming content is determined to be lead-in content (528), final audio result AU1 may be determined (532), and the existing audio may be continued. If the incoming content is not lead-in content (528), a determination may be made (530) whether the existing content comprises video (e.g., a video and/or a video call). If so, processing may continue to the audio:video workflow (536) described below in reference to FIG. 6. If the existing content is not video, a determination may be made (534) whether the existing content is pausable. Pausable content (e.g., audiobooks, songs, movies, videos) may be determined based on the content type and/or based on metadata indicating that the particular content is pausable (e.g., metadata indicating pausability). Non-pausable content (e.g., voice calls, video calls, alarms, etc.) may be similarly identified. If the existing content is not pausable, final audio result AU2 may be determined (538) and the existing audio may be stopped. By contrast, if the existing audio is pausable, final audio result AU1 may be determined (532) and the existing audio may be continued (but may, in some examples, be paused until the conclusion of the incoming content).

Figure 6:
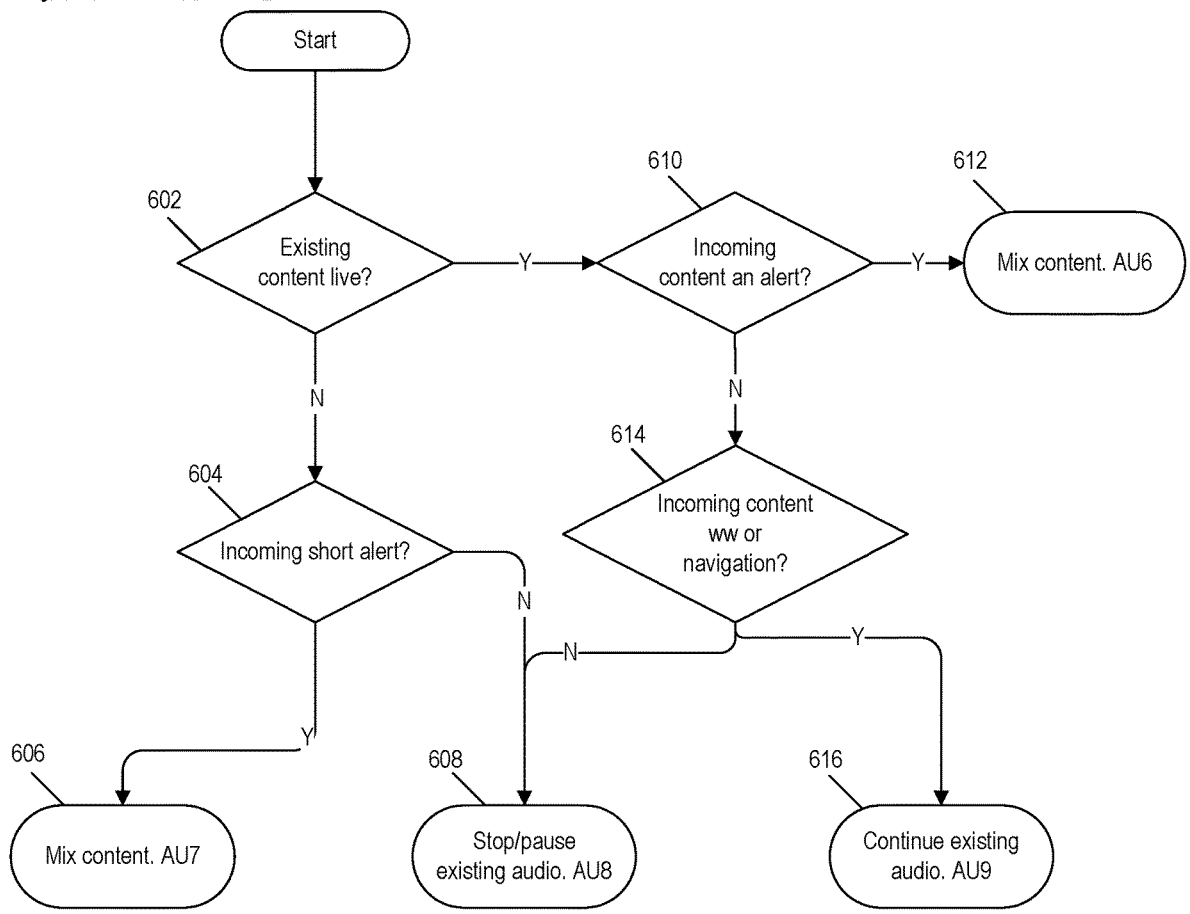
FIG. 6 is a flowchart illustrating an example process for evaluating visual components related to audio channel attributes of incoming and existing activities, in accordance with various aspects of the present disclosure.

FIG. 6 is a flowchart illustrating an example process for evaluating visual components related to audio channel attributes of incoming and existing activities, in accordance with various aspects of the present disclosure.

A determination may be made (602) whether the existing content is live content. Examples of live content may include live broadcasts, video calls, voice calls, security camera video and/or audio feeds, etc. If the existing content is not live, a determination may be made (604) whether the incoming content is a short alert. Short alerts may be content designated by metadata as a short alert that is automatically dismissed after playing. Examples of short alerts may be alarms, indicators indicating available content (e.g., email notifications, subscriber information, etc.). If the incoming content is a short alert, final audio result AU7 may be determined (606), wherein the incoming short alert content is mixed with the existing content (e.g., a chime indicating incoming content is mixed with the existing content). By contrast, if the incoming content is not a short alert, final audio result AU8 may be determined (608), wherein the existing audio is paused (if pausable) or else stopped in favor of the incoming content.

If a determination is made that the existing content is live (602), a determination may be made (610) whether the incoming content is an alert. Alerts may be indicated using metadata received from speech processing-enabled device 110, from a skill, and/or from speech processing computing device(s) 120. Alerts may comprise audible sounds (sometimes referred to as "earcons" to indicate a type of the content (e.g., an incoming message, email, etc.)). If the incoming content is an alert, final audio result AU6 may be determined (612), wherein the incoming content may be mixed with the existing content. For example, the alert may comprise a chime that may be mixed with existing content so that the user is alerted to some incoming event (e.g., an email received). If instead a determination is made that the incoming content is not an alert (610), a determination may then be made (614) whether the incoming content is wakeword related and/or related to touchscreen navigation input, and/or use of a physical interface of speech processing-enabled device 110 (e.g., a home button). If the incoming content is either wakeword-related and/or is related to some touchscreen and/or other physical interface input, final audio result AU9 may be determined (616), wherein the existing audio may be continued. Conversely, if the incoming content is not wakeword-related and/or related to touchscreen and/or other input received through an interface of speech processing-enabled device 110, final audio result AU8 may be determined (608), wherein the existing audio may be paused (if pausable) or else stopped in favor of the incoming content.

Figure 7:
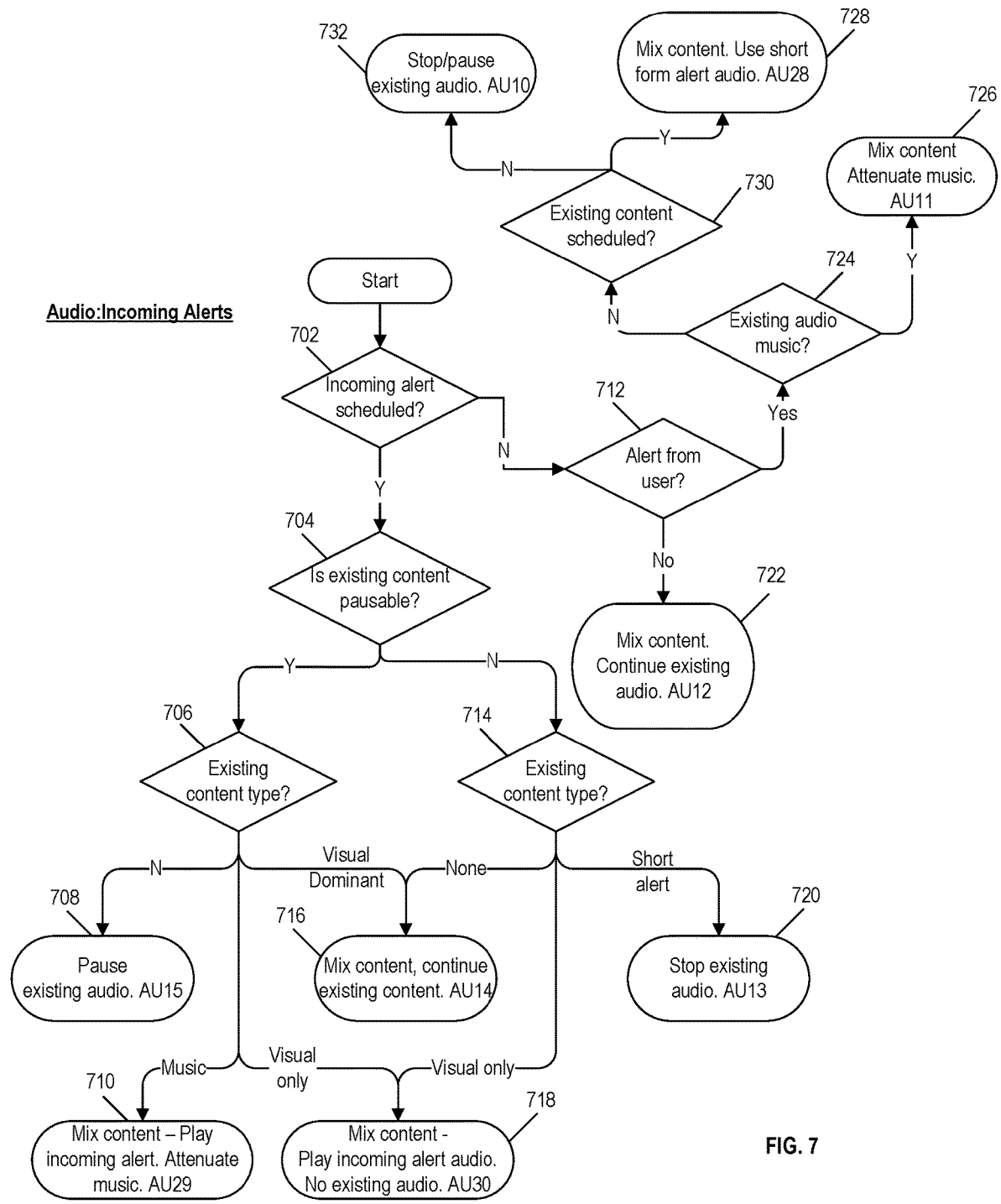
FIG. 7 is a flowchart illustrating an example process for evaluating incoming alerts related to audio channel attributes of incoming and existing activities, in accordance with various aspects of the present disclosure.

FIG. 7 is a flowchart illustrating an example process for evaluating incoming alerts related to audio channel attributes of incoming and existing activities, in accordance with various aspects of the present disclosure.

A determination may be made (702) whether the incoming alert was scheduled (e.g., an alarm that was set). The attribute of whether an alert is scheduled may be indicated by metadata associated with the alert. If so, a determination may be made (704) if the existing content is pausable. If so, a determination may be made (706) as to the type of the existing content. In particular, a determination may be made whether the existing content is music, verbally dominant (e.g., TTS), or visual-only content. If the existing content is neither music, nor verbally dominant, nor visual-only, final audio result AU15 may be determined (708), wherein the existing audio may be paused. If the existing content is classified as visually dominant (e.g., by metadata associated with the existing content), final audio result AU 14 may be determined (716), wherein the existing content may be mixed with the incoming content (e.g., the existing content classified as visually dominant may be continued and the incoming content may be output). If the existing content is music, final audio result AU29 may be determined (710), wherein the incoming alert audio may be played and the volume of the existing music may be attenuated from an initial volume level to an attenuated volume level while the alert plays (and may thereafter be returned to the initial volume after execution of the incoming content has completed). If the existing content is visual only (e.g., no audio), final audio result AU30 may be determined (718), wherein the incoming alert may be mixed with the existing content (as there is no existing audio component to the existing content).

If a determination is made (704) that the existing content is not pausable, the existing content's type may be determined at (714). In particular, a determination may be made whether the existing content is a short alert that is not dismissable or visual-only content? If the existing content is not either a short alert that is not dismissable nor visual-only content, final result AU14 may be determined (716), wherein the existing content may be mixed with the incoming content (e.g., the existing content may be continued). If the existing content is visual only (e.g., no audio), final audio result AU30 may be determined (718), wherein the incoming alert may be mixed with the existing content (as there is no existing audio component to the existing content). If the existing content is a short alert that is non-dismissable, final audio result AU13 may be determined (720), wherein the existing audio may be stopped in favor of the incoming alert. The various audio results (e.g., AU14, AU30, etc.) may be included in an output configuration sent to the speech processing-enabled device 110 as instructions used to control the output of the speech processing-enabled device 110 as a result of the interruption.

If a determination is made (702) that the incoming alert was not scheduled, a determination may be made (712) whether the alert originated from a user or from the speech processing computing device(s) 120. If the alert is from speech processing computing device(s) 120 (e.g., not a user-generated alert), final audio result AU12 may be determined (722), wherein the incoming alert may be mixed with the existing audio. Examples, of alerts generated by users may include incoming voice calls and video calls. If a determination is made (712) that the alert was generated by a user, a determination may be made (724) whether the existing content is music. If so, final audio result AU11 may be determined (726), wherein the incoming alert may be mixed with the music and the music may be temporarily attenuated while the alert plays.

If the existing content is not music, a determination may be made (730) whether the existing content is scheduled content. If so, final audio result AU28 may be determined (728) and the incoming alert may be mixed with the existing audio. In various examples, a short form of the alert audio may be played for audio result AU28 to avoid playing the alert sound for a long period of time, which may be annoying to the user. If the existing content is not scheduled content, final audio result AU10 may be determined (732), wherein the existing audio may be paused (if pausable) or otherwise may be stopped.

Figure 8:
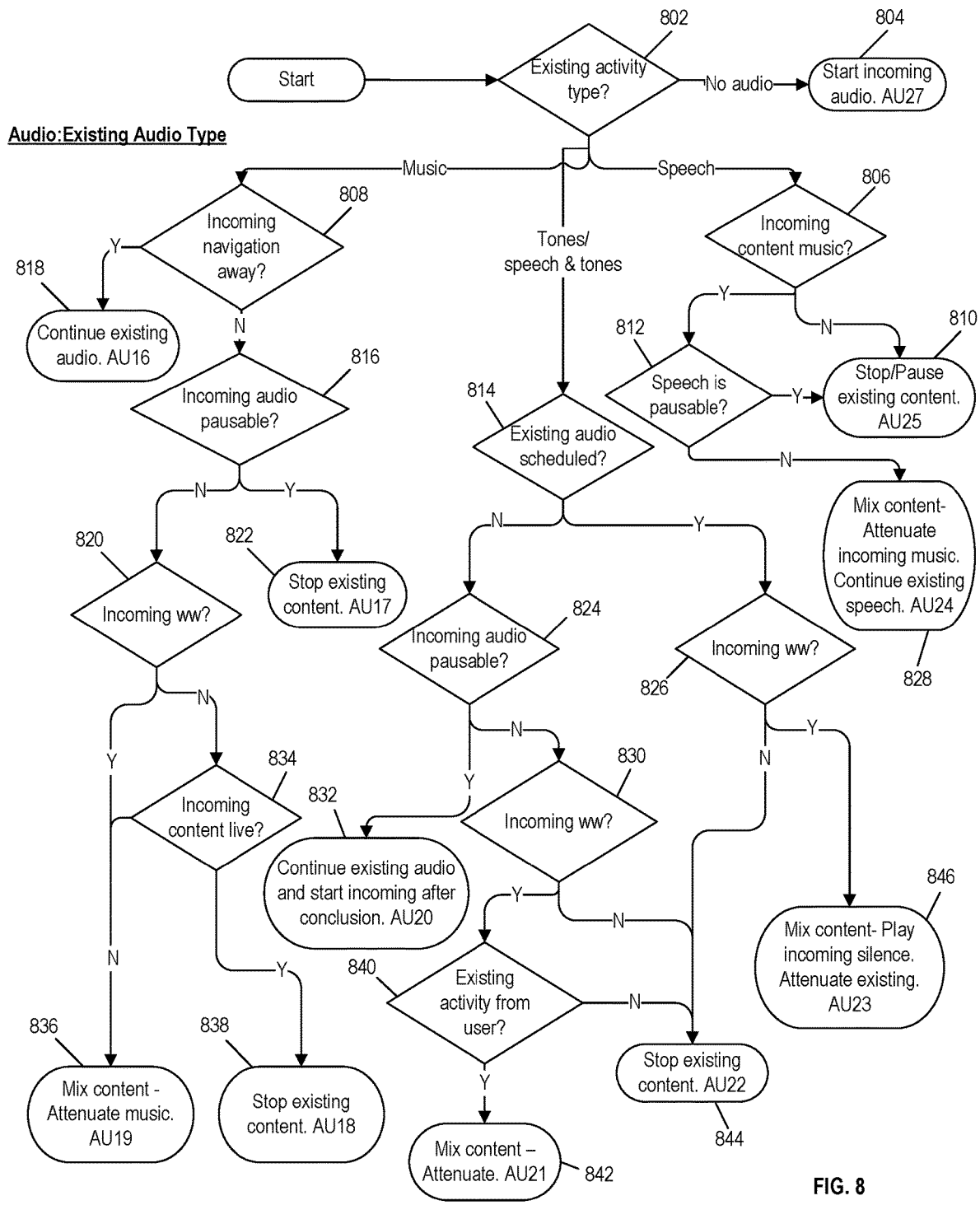
FIG. 8 is a flowchart illustrating an example process for evaluating the existing audio attributes for the audio channel, in accordance with various aspects of the present disclosure.

FIG. 8 is a flowchart illustrating an example process for evaluating the existing audio attributes for the audio channel, in accordance with various aspects of the present disclosure.

A determination may be made as to the existing activity type (802). In particular, a determination may be made whether the audio of the existing content is music, speech, no audio, or tones/tones combined with speech. If the existing activity type is no audio, final audio result AU27 may be determined (804), wherein the incoming audio may be played, as there is no existing audio.

If the existing audio type is music, a determination may be made (808) whether the incoming content is a navigation away from the current screen. If so, final audio result AU16 may be determined (818), wherein the existing audio may be continued. If the incoming content is not a navigation away from the current screen, a determination may be made (816) whether the incoming audio is pausable and recoverable (e.g., after the existing content is concluded). If so, final audio result AU17 may be determined (822), wherein the existing content may be stopped. If the incoming audio is not pausable, a determination may be made (820) whether the incoming content is wakeword related. If so, final audio result AU19 may be determined (836), wherein the incoming audio may be mixed with the music and the music may be attenuated. If the incoming content is not wakeword-related (820) a determination may be made whether the incoming content is live content (834). If not, final audio result AU19 may be determined (836—described above). If the incoming content is live, final audio result AU18 may be determined (838), wherein the existing content may be stopped in favor of the incoming content.

If the existing audio type is tones or some combination of tones and speech, a determination may be made (814) whether the existing audio is scheduled (e.g., a scheduled reminder). If the existing audio is not scheduled, a determination may be made (824) whether the incoming content can be paused during execution and recovered. If so, final audio result AU20 may be determined (832), wherein the existing audio may be continued and the incoming audio may be started at the conclusion of the existing audio. If the incoming content cannot be paused, a determination may be made (830) whether the incoming content is wakeword related. If not, final audio result AU22 may be determined (844) wherein the existing content may be stopped in favor of the incoming content. If a determination is made that the incoming content is wakeword related (e.g., an incoming wakeword, content related to the speech processing-enabled device 110 listening following detection of the wakeword, etc.), a determination may be made (840) whether the existing activity originated from a user. If so, final audio result AU 21 may be determined (842), wherein the incoming content may be mixed with the existing content and the existing content may be silenced and/or attenuated. If the existing activity did not originate from a user, final audio result AU22 may be determined (844), wherein the existing content may be stopped in favor of the incoming content.

If a determination is made (814) that the existing audio is scheduled, a determination may be made (826) whether the incoming content is wakeword related. If so, final audio result AU23 may be determined (846), wherein the incoming content may be mixed with the existing content and the existing content may be attenuated while the incoming content plays. In various examples, short form versions of any chimes may be used for the incoming content for final audio result AU23. If the incoming content is not wakeword related, final audio result AU22 may be determined (844), wherein the existing content may be stopped in favor of the incoming content.

If a determination is made (802) that the existing audio type is speech, a determination may be made (806) whether the incoming content is music. If the incoming content is not music, final audio result AU25 may be determined (810), wherein the existing content may be paused (if pausable) or stopped. If the incoming content is music, a determination may be made (812) whether the existing speech is pausable. If the existing speech is pausable, final audio result AU25 may be determined (810—described above). If the existing speech is not pausable, final audio result AU24 may be determined (828), wherein the incoming music may be started and attenuated and the existing speech may be continued.

Figure 9:
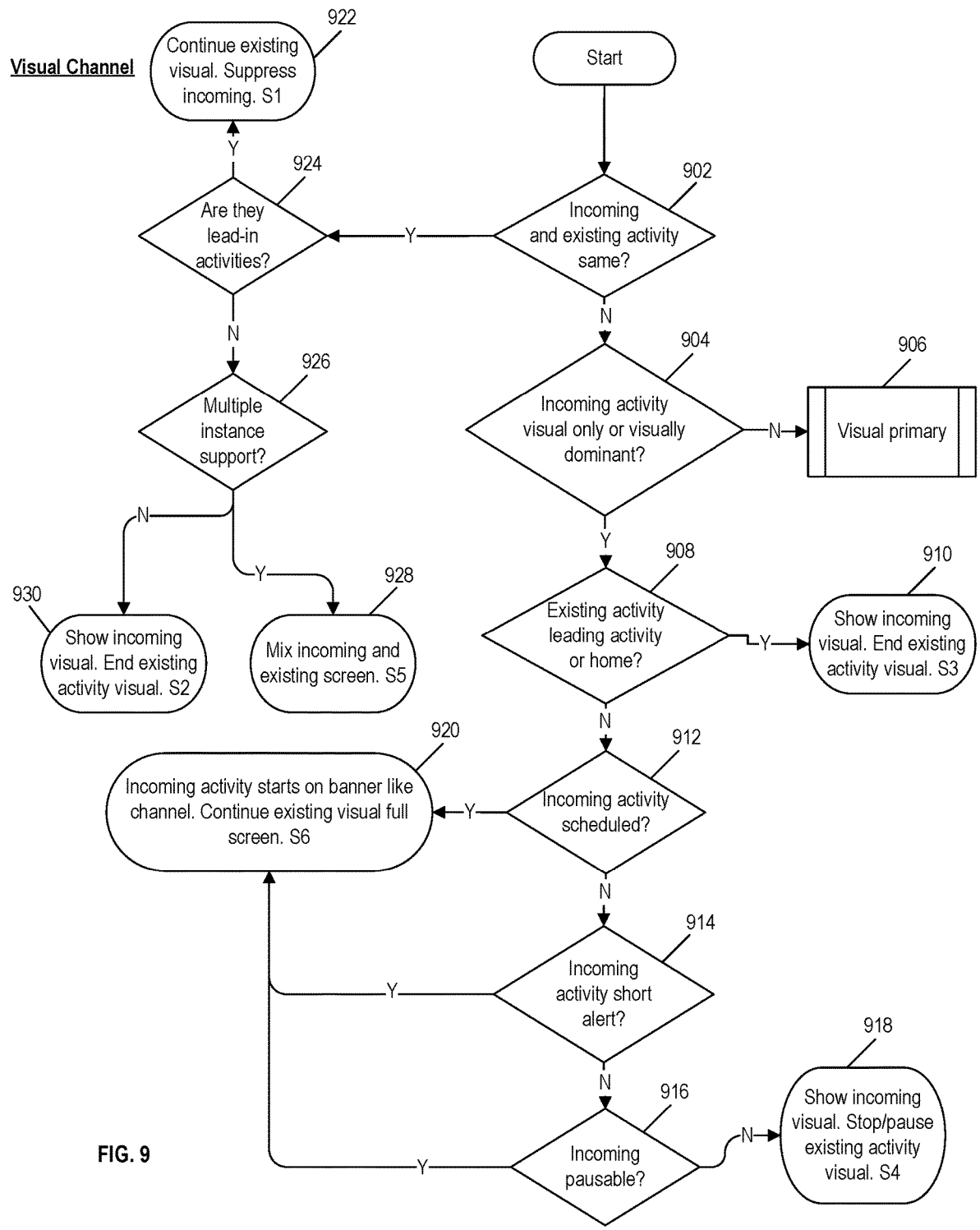
FIG. 9 is a flowchart illustrating an example process for evaluating the visual channel attributes of incoming and existing activities, in accordance with various aspects of the present disclosure.

FIG. 9 is a flowchart illustrating an example process for evaluating the visual channel attributes of incoming and existing activities, in accordance with various aspects of the present disclosure. In some cases, after processing the audio channel (410 in FIG. 4) or, when there is no existing audio, the visual channel workflow (414 in FIG. 4) may be processed.

A determination may be made (902) whether the incoming activity and the existing activity are exactly the same (e.g., the same content is requested twice). If the incoming and existing activities are not exactly the same, a determination may be made (904) if the incoming activity is visual only or visually dominant. If the incoming activity is not visual only or visually dominant, processing may continue to the visual primary workflow (906) described below in reference to FIG. 10. If the incoming activity is visual only or visually dominant, a determination may be made (908) whether the existing activity is a leading activity or a navigation to a home screen. If so, final visual result S3 may be determined (910) wherein the incoming visual may be displayed and the existing activity visual may be ended. If the existing activity is not a leading activity or a navigation to a home screen, a determination may be made (912) whether the incoming activity is scheduled. If so, final visual result S6 may be determined (920), wherein the incoming activity may be displayed in a banner-like channel on the display while the existing activity continues in a full-screen mode. If the incoming activity is not scheduled, a determination may be made (914) if the incoming activity is designated as a short alert that cannot be dismissed. If so, final visual result S6 may be determined (920, described above). If not, a determination may be made (916) whether the incoming activity can be paused and recovered. If so, final visual result S6 may be determined (920, described above). If not, final visual result S4 may be determined (918), wherein the incoming visual is shown and the existing activity is paused (if pausable) or stopped.

If a determination is made that the incoming and existing activities are exactly the same (902), a determination may be made (924) whether the incoming and existing activities are leading activities. If so, final visual result S1 may be determined (922), wherein the existing visual may be continued and the incoming visual may be suppressed (e.g., not displayed). If the incoming and existing activities are not leading activities, a determination may be made (926) if the activity supports multiple instances of the same activity. If so, final visual result S5 may be determined (928) wherein the incoming and existing screen may be mixed to simultaneously display both the incoming and existing activities (e.g., by splitting the screen vertically, horizontally, doing picture-in-picture, or any other desired method of mixing the images). If multiple instances are not supported, final visual result S2 may be determined (930), wherein the incoming visual may be shown and the existing activity visual may be ended.

Figure 10:
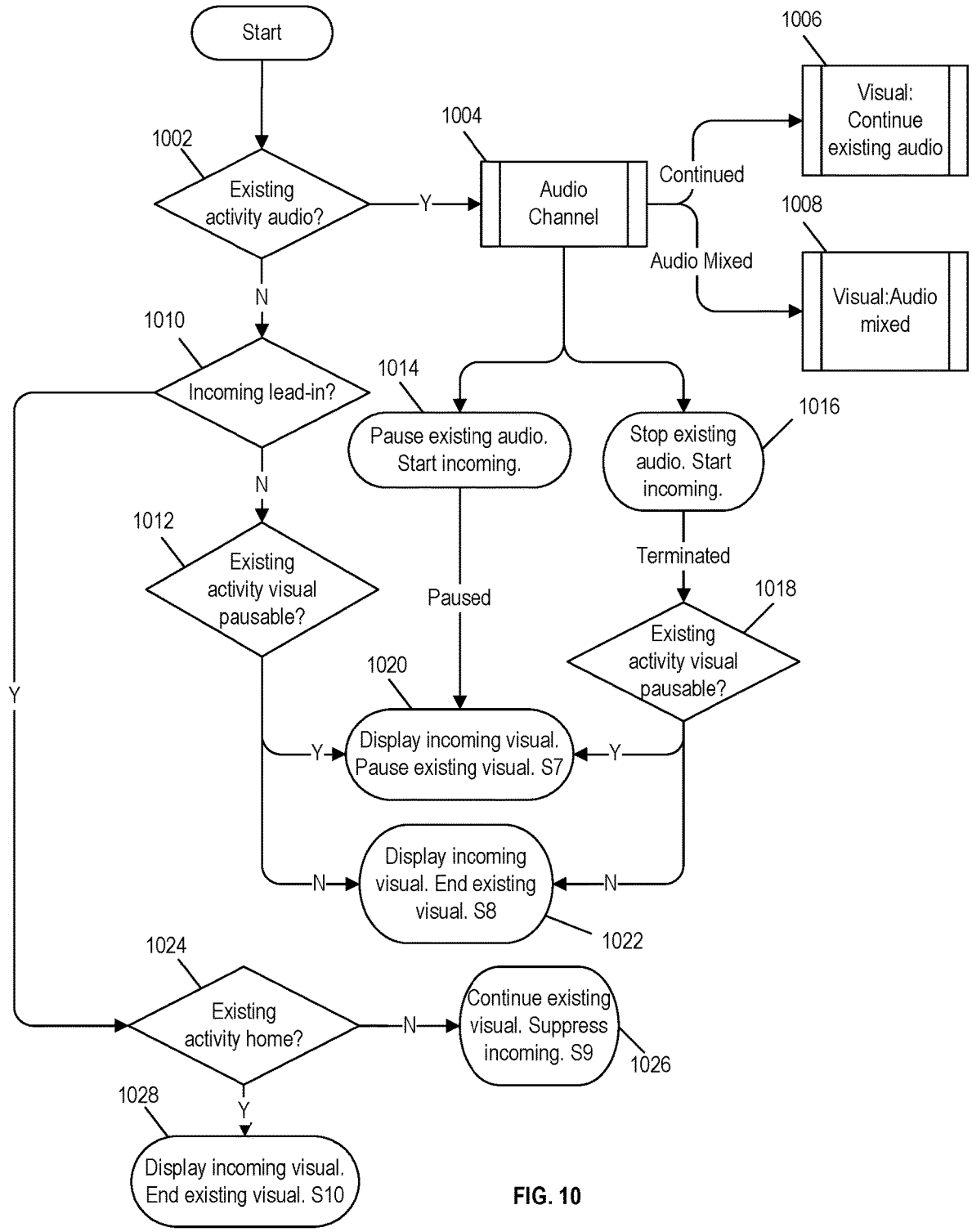
FIG. 10 is a flowchart illustrating another example process for evaluating the visual channel attributes of incoming and existing activities, in accordance with various aspects of the present disclosure.

FIG. 10 is a flowchart illustrating another example process for evaluating the visual channel attributes of incoming and existing activities, in accordance with various aspects of the present disclosure. A determination may be made (1002) whether an existing activity (if one exists) has audio. If so, processing may continue (1004) to the audio channel processing described above in reference to FIGS. 5-8. If the outcome of the audio channel processing is to continue existing audio (e.g., audio result AU9 (616)), processing may proceed to visual:continue existing audio processing (1006) described below in reference to FIG. 11. By contrast, if the outcome of the audio channel processing is to mix incoming and existing audio (e.g., audio result AU7 (606)), processing may proceed to visual:audio mixed processing (1008) described below in reference to FIG. 12. If the outcome of the audio channel processing is to pause existing audio and start incoming audio (1014) (e.g., audio result AU8 (608)), final visual result S7 may be determined (1020), wherein the incoming visual may be displayed and the existing visual may be paused in the background. If the outcome of the audio channel processing is to stop existing audio and start incoming audio (1016) (e.g., audio result AU13 (720)), a determination may be made (1018) whether the existing activity visual component is pausable. If so, final visual result S7 may be determined (1020), as described above. If the existing activity visual component is not pausable, final visual result S8 may be determined (1022), wherein the incoming visual may be displayed and the existing visual may be ended.

If a determination is made (1002) that the existing activity has no audio, a determination may be made (1010) if the incoming activity is a leading activity. If the incoming activity is not a leading activity, a determination may be made (1012) whether or not the existing activity visual component is pausable. If so, final visual result S7 may be determined (1020), as previously described. If not, final visual result S8 may be determined (1022), as previously described.

If a determination is made that the incoming activity is a leading activity (1010), a determination may be made (1024), if the existing activity is a navigation to a home screen. If so, final visual result S10 may be determined (1028), wherein the incoming visual may be displayed and the existing visual may be ended. If a determination is made (1024) that the existing activity is not a navigation to a home screen, final visual result S9 may be determined (1026), wherein the existing visual may be continued and the incoming visual may be suppressed.

Figure 11:
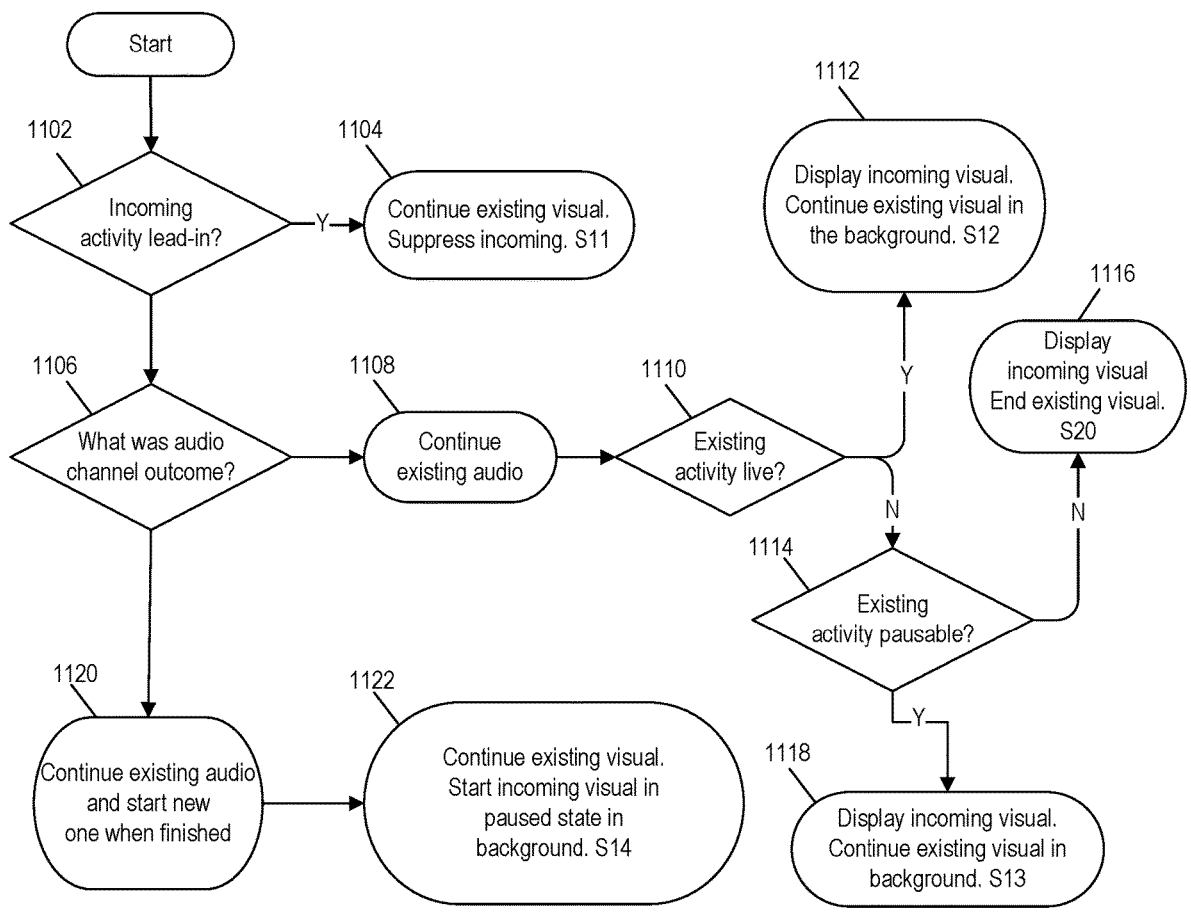
FIG. 11 is a flowchart illustrating another example process for evaluating the visual channel attributes of incoming and existing activities based on an outcome of the flowchart of FIG. 10, in accordance with various aspects of the present disclosure.

FIG. 11 is a flowchart illustrating another example process for evaluating the visual channel attributes of incoming and existing activities based on an outcome of the flowchart of FIG. 10, in accordance with various aspects of the present disclosure.

A determination may be made (1102) whether the incoming activity is a lead-in activity. If so, final visual result S11 may be determined (1104), wherein the existing visual may be continued and the incoming visual may be suppressed. If the incoming activity is not a lead-in activity (1102), the audio channel outcome may be determined. If the audio channel outcome was to continue the existing audio (1108) (e.g., audio result AU9 (616)), a determination may be made whether the existing activity is live. If so, final visual result S12 may be determined (1112) wherein the incoming visual is displayed while continuing the existing visual in the background, and, in some examples, showing a live activity bar or banner to indicate that the live activity is being displayed in the background. If the existing activity is not a live activity (1110), a determination may be made (1114) whether the existing activity is pausable. If not, (e.g., a video call), final visual result S20 may be determined (1116), wherein the incoming visual may be displayed and the existing visual may be ended. If the existing activity is pausable (1114), final visual result S13 may be determined (1118), wherein the incoming visual may be displayed and the existing visual may be continued and/or paused in the background.

If the audio channel outcome (1106) is to continue the existing activity audio and start the incoming audio at the conclusion of the existing audio (1120) (e.g., audio result AU9 (616)), final visual result S14 may be determined (1122), wherein the existing visual may be continued and the incoming visual may be started in a paused state in the background.

Figure 12:
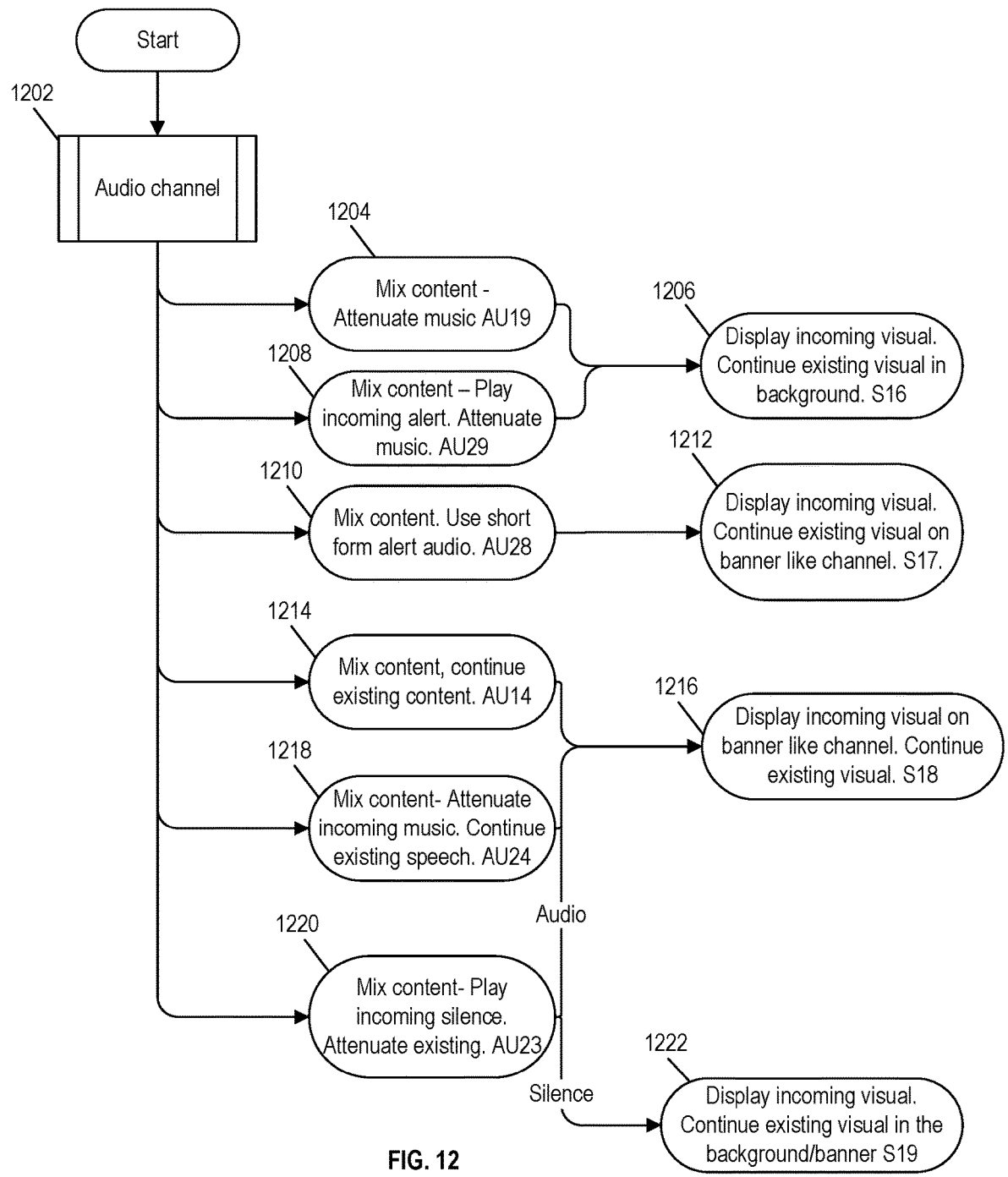
FIG. 12 is a flowchart illustrating an example process for mixing existing and incoming audio, in accordance with various aspects of the present disclosure.

FIG. 12 is a flowchart illustrating an example process for mixing existing and incoming audio, in accordance with various aspects of the present disclosure. The processing of FIG. 12 may be continued from the workflow of FIG. 10 at the processing step visual:audio mixed (1008). The outcome of the audio channel may be determined (1202). If the outcome of the audio channel is AU19 (1204) (mix content, playing incoming silence/audio, attenuate music), final visual result S16 may be determined (1206), wherein the incoming visual may be displayed and the existing visual may be continued in the background. Similarly, if the outcome of the audio channel is AU29 (1208) (mix content, play incoming alert, attenuate music), final visual result S16 may be determined (1206).

If the outcome of the audio channel is AU28 (1210) (mix content, use short form alert audio), final visual result S17 may be determined (1212), wherein the incoming visual may be displayed and the existing visual may be continued as a banner and/or on some reduced-size portion of the display screen.

If the outcome of the audio channel is AU14 (1214) (mix content, continue existing content), final visual result S18 may be determined (1216), wherein the incoming visual may be displayed as a banner and/or on some reduced-size portion of the display screen. If the outcome of the audio channel is AU24 (1218) (mix content, attenuate existing music, continue existing speech), final visual result S18 may be determined. If the outcome of the audio channel is Au23 (1220) (mix content, play incoming silence, attenuate existing audio), final visual result S19 may be determined (1222), wherein the incoming visual may be displayed and the existing visual may be continued either in the background or as a display banner.

Figure 13:
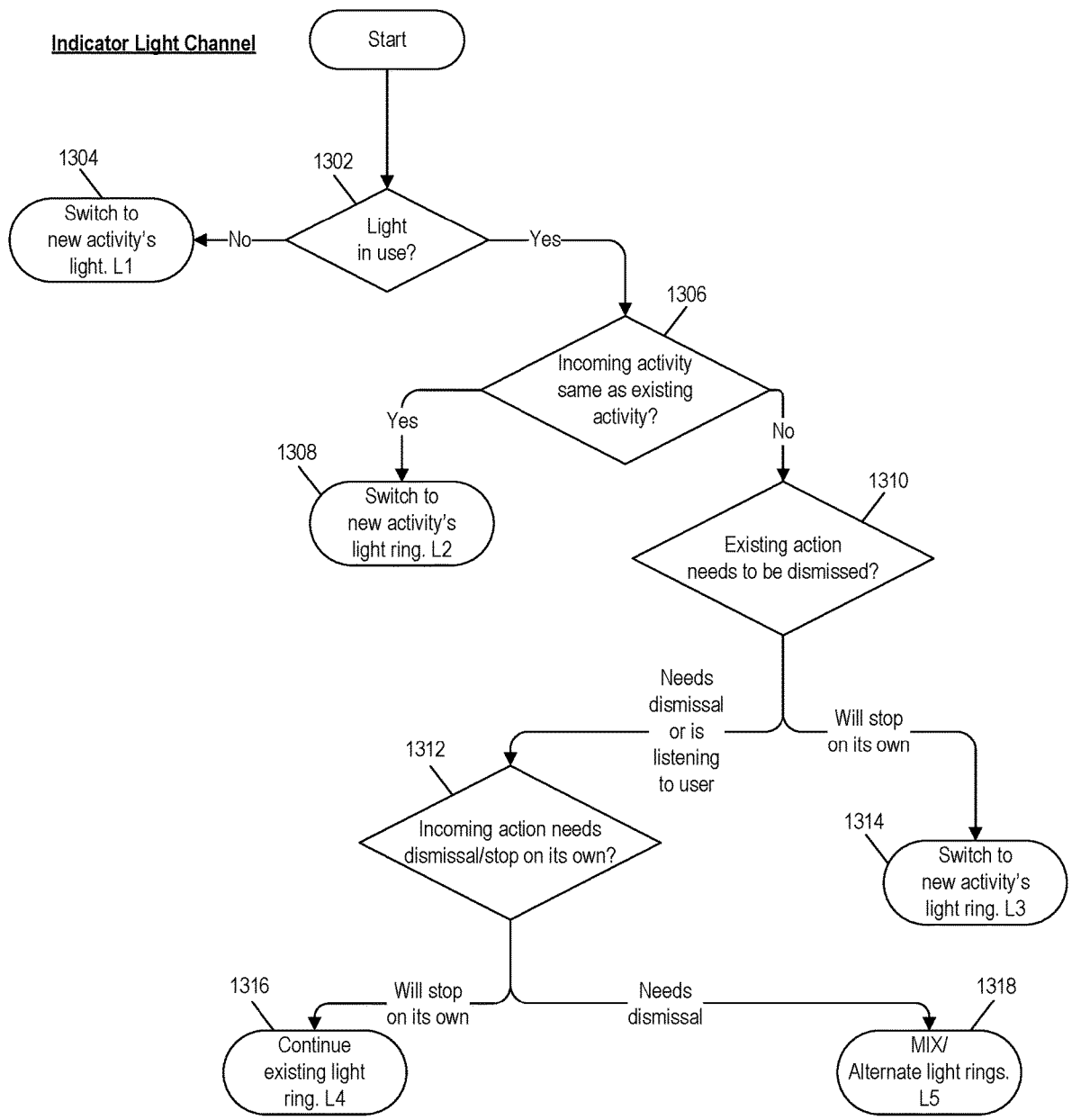
FIG. 13 is a flowchart illustrating an example process for determining an action to take using an indicator light of a speech processing-enabled device, in accordance with various aspects of the present disclosure.

FIG. 13 is a flowchart illustrating an example process for determining an action to take using an indicator light of a speech processing-enabled device, in accordance with various aspects of the present disclosure.

In various examples, speech processing-enabled device 110 may have one or more indicator lights to indicate incoming content, that the device is listening for audio after wakeword detection, that the device is processing and/or awaiting content from one or more backend systems, etc. FIG. 13 depicts an example process for determining indicator light activity when existing content is interrupted by incoming content on speech processing-enabled device 110. Indicator light data (e.g., attribute data) may be determined for both incoming and/or existing activities on a speech processing-enabled device 110 and may be used to parse the indicator light channel workflow depicted in FIG. 13 to determine indicator light result data.

A determination may be made (1302) whether the indicator light is in use. If the indicator light is not in use, final indicator light result L1 may be determined (1304), wherein the incoming activities indicator light may be displayed according to the incoming activity's indicator light modality (e.g., solid pattern for a specified amount of time, flashing, rotating, etc.). If the indicator light is determined to be in use (1302), a determination may be made (1306) whether the incoming activity is the same as the existing activity. If so, final indicator light result L2 may be determined (1308), wherein the incoming activity's indicator light modality may be employed. If the incoming activity is not the same as the existing activity, a determination may be made (1310) whether the existing activity needs to be dismissed or whether the existing activity will stop on its own. For example, notifications received on speech processing-enabled device 110 (e.g., an email, voicemail, etc.) may cause the indicator light to flash or otherwise emit a light pattern and may persist for a given time period and/or until a user dismissed the notification. By contrast, an indicator light may flash when the device detects a wakeword and may thereafter stop flashing (e.g., be dismissed on its own). If the existing activity will stop on its own (e.g., after completion), final indicator light result L3 may be determined (1314), wherein the indicator light modality may switch to the incoming activity's indicator light modality. By contrast, if the existing action requires dismissal or is listening to the user (e.g., following detection of a wakeword), a determination may be made (1312) whether the incoming action needs to be dismissed or whether it will stop on its own. If the incoming action will stop on its own, final indicator light result L4 may be determined (1316), wherein the existing activity's indicator light modality may be used. If the incoming action requires dismissal in order to stop, final indicator light result L5 may be determined (1318), wherein the light ring modalities may be mixed and/or alternate light rings different from those of both the incoming and existing activities may be used (e.g., according to a specified pattern/modality).

FIG. 14A is a block diagram showing an example architecture 400 of a computing device (e.g., speech processing-enabled device 110), in accordance with various aspects of the present disclosure. It will be appreciated that not all devices will include all of the components of the architecture 1400 and some user devices may include additional components not shown in the architecture 1400. The architecture 1400 may include one or more processing elements 1404 for executing instructions and retrieving data stored in a storage element 1402. The processing element 1404 may comprise at least one processor. Any suitable processor or processors may be used. For example, the processing element 1404 may comprise one or more digital signal processors (DSPs). In some examples, the processing element 1404 may be effective to determine state data related to current resource usage of the speech processing-enabled device 110. Additionally, the processing element 1404 may be effective to determine metadata identifying and/or used to identify incoming and/or existing activity attributes for activities executing on the processing element 1404. The storage element 1402 can include one or more different types of memory, data storage, or computer-readable storage media devoted to different purposes within the architecture 1400. For example, the storage element 1402 may comprise flash memory, random-access memory, disk-based storage, etc. Different portions of the storage element 1402, for example, may be used for program instructions for execution by the processing element 1404, storage of images or other digital works, and/or a removable storage for transferring data to other devices, etc.

The storage element 1402 may also store software for execution by the processing element 1404. An operating system 1422 may provide the user with an interface for operating the computing device and may facilitate communications and commands between applications executing on the architecture 1400 and various hardware thereof. A transfer application 1424 may be configured to receive images, audio, and/or video from another device (e.g., a mobile device, image capture device, and/or display device) or from an image sensor 1432 and/or microphone 1470 included in the architecture 1400. In some examples, the transfer application 1424 may also be configured to send the received voice requests to one or more voice recognition servers (e.g., speech processing computing device(s) 120).

When implemented in some user devices, the architecture 1400 may also comprise a display component 1406. The display component 1406 may comprise one or more light-emitting diodes (LEDs) or other suitable display lamps. Also, in some examples, the display component 1406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 1406 may be effective to display content determined provided by a skill executed by skill computing device(s) 125. In some examples, the content displayed by display component 1406 may be existing content and/or incoming content described herein.

The architecture 1400 may also include one or more input devices 1408 operable to receive inputs from a user. The input devices 1408 can include, for example, a push button, touch pad, touch screen, wheel, joystick, keyboard, mouse, trackball, keypad, light gun, game controller, or any other such device or element whereby a user can provide inputs to the architecture 1400. These input devices 1408 may be incorporated into the architecture 1400 or operably coupled to the architecture 1400 via wired or wireless interface. In some examples, architecture 1400 may include a microphone 1470 or an array of microphones for capturing sounds, such as voice requests. Voice recognition engine 1480 may interpret audio signals of sound captured by microphone 1470. In some examples, voice recognition engine 480 may listen for a wakeword to be received by microphone 1470. Upon receipt of the wake-word, voice recognition engine 1480 may stream audio to a voice recognition server for analysis, such as speech processing computing device(s) 120. In various examples, voice recognition engine 1480 may stream audio to external computing devices via communication interface 1412.

When the display component 1406 includes a touch-sensitive display, the input devices 1408 can include a touch sensor that operates in conjunction with the display component 1406 to permit users to interact with the image displayed by the display component 406 using touch inputs (e.g., with a finger or stylus). The architecture 1400 may also include a power supply 1414, such as a wired alternating current (AC) converter, a rechargeable battery operable to be recharged through conventional plug-in approaches, or through other approaches such as capacitive or inductive charging.

The communication interface 1412 may comprise one or more wired or wireless components operable to communicate with one or more other computing devices. For example, the communication interface 1412 may comprise a wireless communication module 1436 configured to communicate on a network, such as the network 104, according to any suitable wireless protocol, such as IEEE 802.11 or another suitable wireless local area network (WLAN) protocol. A short range interface 1434 may be configured to communicate using one or more short range wireless protocols such as, for example, near field communications (NFC), Bluetooth, Bluetooth LE, etc. A mobile interface 1440 may be configured to communicate utilizing a cellular or other mobile protocol. A Global Positioning System (GPS) interface 1438 may be in communication with one or more earth-orbiting satellites or other suitable position-determining systems to identify a position of the architecture 1400. A wired communication module 1442 may be configured to communicate according to the USB protocol or any other suitable protocol.

The architecture 1400 may also include one or more sensors 1430 such as, for example, one or more position sensors, image sensors, and/or motion sensors. An image sensor 1432 is shown in FIG. 14A. Some examples of the architecture 1400 may include multiple image sensors 1432. For example, a panoramic camera system may comprise multiple image sensors 1432 resulting in multiple images and/or video frames that may be stitched and may be blended to form a seamless panoramic output. An example of an image sensor 1432 may be a camera configured to capture color information, image geometry information, and/or ambient light information.

Figure 14B:
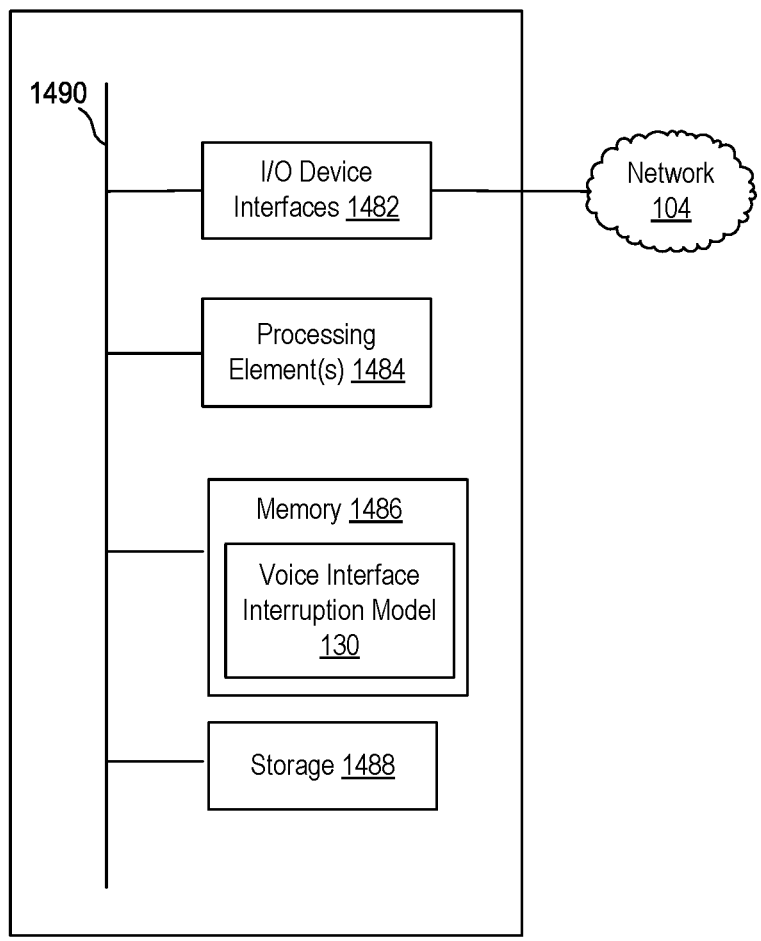

FIG. 14B is a block diagram conceptually illustrating example components of a remote device, voice interface interruption model 130, skill computing device(s) 125 and/or speech processing computing device(s) 120, which may assist with ASR processing, NLU processing, applicable protocol recognition, skill execution, and/or command processing. Multiple skill computing device(s) 125, voice interface interruption models 130, and/or speech processing computing device(s) 120 may be included in the system, such as one speech processing computing device 120 for performing ASR processing, one speech processing computing device 120 for performing NLU processing, one or more computing devices implementing voice interface interruption models 130, one or more skill computing device(s) 125 implementing skills, etc. In operation, each of these devices (or groups of devices) may include computer-readable and computer-executable instructions that reside on the respective device, as will be discussed further below.

Each of these devices (130/120/125/) may include one or more controllers/processors 1484, which may each include at least one central processing unit (CPU) for processing data and computer-readable instructions, and a memory 1486 for storing data and instructions of the respective device. In at least some examples, memory 1486 may store, for example, a list of N-best intents data that may be generated for a particular utterance. In some examples, memory 1486 may store attributes of existing activities and/or incoming activities for various speech processing-enabled devices 110. In various further examples, memory 1486 may be effective to store instructions effective to program controllers/processors 1484 to perform the various techniques described above in reference to voice interface interruption model 130. Accordingly, in FIG. 14B, voice interface interruption model 130 is depicted as being stored within memory 1486. The memories 1486 may individually include volatile random access memory (RAM), non-volatile read only memory (ROM), non-volatile magnetoresistive memory (MRAM), and/or other types of memory. Each device (130/120/125) may also include a data storage component 1488 for storing data and controller/processor-executable instructions. Each data storage component 1488 may individually include one or more non-volatile storage types such as magnetic storage, optical storage, solid-state storage, etc. Each device (130/120/125/) may also be connected to removable or external non-volatile memory and/or storage (such as a removable memory card, memory key drive, networked storage, etc.) through respective input/output device interfaces 1482.

Computer instructions for operating each device (130/120/125) and its various components may be executed by the respective device's controllers/processors 1484, using the memory 1486 as temporary "working" storage at runtime. A device's computer instructions may be stored in a non-transitory manner in non-volatile memory 1486 (e.g., a non-transitory computer-readable memory), storage 1488, or an external device(s). Alternatively, some or all of the executable instructions may be embedded in hardware or firmware on the respective device in addition to or instead of software.

Each device (130/120/125) includes input/output device interfaces 1482. A variety of components may be connected through the input/output device interfaces 1482, as will be discussed further below. Additionally, each device (130/120/125) may include an address/data bus 1490 for conveying data among components of the respective device. Each component within a device (130/120/125) may also be directly connected to other components in addition to (or instead of) being connected to other components across the bus 1490.

As noted above, multiple devices may be employed in a single system. In such a multi-device system, each of the devices may include different components for performing different aspects of the system's processing. The multiple devices may include overlapping components. The components of the voice interface interruption model 130 and the speech processing computing device(s) 120, as described herein, are exemplary, and may be located as a stand-alone device or may be included, in whole or in part, as a component of a larger device or system.

Attribute Determination

Described below is additional detail regarding attribute determination for use in determining the interruption experience by the voice interface interruption model 130.

Audio types (which may be an example of an audio attribute) may comprise "tones/speech+tones," "TTS/spoken word," and "music." The different audio types may impact the ability to mix audio content with other audio content. For example, existing music may be attenuated in favor of incoming TTS. Additionally, incoming short tones may be played over existing TTS and/or existing music, but incoming TTS cannot be played over existing TTS (as such a mixing may produce unintelligible speech).

Visual types (which may be an example of visual attributes) may comprise classifications of "visual only," "visually dominant," "visual+audio equally dependent," "visual support," "visual presence," and/or "audio only." Content classified as "visual only" may be content wherein visual content is the only modality (e.g., the content does not include speech or other audio). Content classified as "visually dominant" may be content wherein the visual portion of the content is the core modality, although audio/voice may support the visual portion of the content. Content classified as "visual+audio equally dependent" describes synced and/or dependent audio and video (e.g., a music video) that are inseparable. Content classified as "visual support" may be content where visuals are a support to enhance the core voice/audio experience (e.g., a lecture with slides illustrating some concepts). Content classified as "visual presence" may be content where visuals are used as indicators of the currently-executing activity (e.g., icons and/or status bars). Content classified as "audio only" may be content that has no visual component (e.g., audio only). Metadata and/or state data of speech processing-enabled device 110 may be used to indicate and/or determine the visual type attribute data described above for incoming and/or existing activities.

Pausability (which may be an example of an activity attribute) determines whether content (audio and/or video) may be paused and then resumed from the point at which the content is paused without causing an unacceptable or undesirable negative impact on the user experience. Typically, long-running content (e.g., movies, songs, etc.) may be paused and later resumed prior to the content timing out (e.g., if the content is paused beyond a timeout threshold, the content may be ended). Short running activities, conversely, may end when they are interrupted by incoming content and may be unrecoverable.

Multi-instance support is an attribute that indicates whether two similar activities may co-exist in all channels (e.g., audio, visual, and/or light indicator). In various examples, multi-instance support may be encoded using an indicator bit either indicating that multi-instance support is or is not available. For example, two timers may be run in parallel and thus may include multi-instance support. By contrast, only one song/video/audiobook may be output at one time.

Location and multi-device experience may be attributes for determining where (e.g., to which speech processing-enabled device) to deliver incoming content when multiple speech processing-enabled devices are present. A first attribute may indicate that the incoming content is user driven. For example, content that is requested by the user invoking a wakeword, pressing a button on the speech processing-enabled device 110 (or touching the screen). For user driven content, the incoming content may be delivered to the device with which the user is interacting.

User specific content may be content that is destined for a particular user. In various examples, in such examples, the voice interface interruption model 130 may attempt to determine the location of the user. As previously described, use of and/or storage of user location data, as with any data stored, used, and/or available to a speech processing-enabled device may be controlled by the user through a companion application. Accordingly, if the user does not want the device to capture and/or store user location data, the user may configure the device to not collect and/or store such data. In various examples, the speech processing-enabled device 110 may determine user location by checking to see if the user has interacted with any devices associated with the user's account within the last 30 seconds (or some other suitable period of time). In some further examples, user presence may be detected using computer vision and/or voice recognition. The incoming content may be delivered to the device that is associated with the user's location.

Shared content may be content that is not user specific (and may be device specific). For example, if a speech processing-enabled device is associated with a smart television, a request to play a movie may be sent to the speech processing-enabled device associated with the television (if no other location is specified in the request).

As previously described, a wakeword-related activity (or state) may comprise a sequence of events wherein a speech processing-enabled device 110 has detected a wakeword, is processing a user request, and/or has received a touchscreen and/or other physical interface command. Metadata and/or state data may be used to indicate wakeword related activities for the various computer-implemented workflows described above, so that the appropriate interruption experience may be determined by voice interface interruption model 130.

A timeframe attribute may determine if interrupting content should be immediately deployed or not. All incoming content derived from wakeword-related activities may be sent to the relevant speech processing-enabled device 110 for immediate execution. However, in some examples other incoming content may be delayed until the user has completed an existing activity. For example, if the user requests that the speech processing-enabled device let the user know when flight 123 has landed, but the user is in the middle of a complex task and/or a task with financial implications (e.g., the user is purchasing a product), the incoming task may be delayed until the existing task is completed. In various examples, a determination of when to interrupt may be made based on a current level of user engagement.

High active engagement may be interactions with the user wherein the user is providing input. Examples of high user engagement activities may be turn-based interactions with the user, receiving live speech from the user, composing sending user messages, cook-along programs where the user is consuming a step-by-step cooking video (and/or audio), a timer/alarm, an incoming voice or video call, a long-running visual, etc. High passive engagement may require user attention, but no user input. Examples may include short running activities, video, long-running, non-mixable audio, etc. Low passive engagement does not require user attention or input. Examples may include inactive states and/or thinking/processing by the speech processing-enabled device 110. Additionally, users may enter a "do not disturb" mode wherein all interrupting content may be delayed until the user exits the do not disturb mode. Additionally, content may expire while a device is in do not disturb mode. In such cases the interrupting, expired content will not be output. In various examples, user engagement attributes (described above) may be used to determine whether or not, and when, to interrupt existing content with incoming content.

FIG. 15 depicts a table 1500 illustrating example content along with example attributes, in accordance with some aspects of the present disclosure.

Table 1500 depicts three types of content: Music, Live News/Sports Video, and Audiobook. These content types are examples only and other content types may be used in accordance with the various techniques described herein. Additionally, table 1500 depicts the example attributes: Pausable, Live, Audio type, Visual type, Lead-in, and Multiple instance support. However, more or fewer attributes (such as those previously described herein) may be used, in accordance with the various techniques described herein. For example, state data indicating hardware resource usage of speech processing-enabled device 110 may be used in as an attribute to determine the interruption experience output configuration.

In the example depicted in table 1500, the music content may be associated with metadata representing attributes describing attributes of the music. For example, the music content may be associated with metadata indicating that the content is pausable (e.g., an indicator bit or bits indicating that the content is pausable). Additionally, metadata may be used to indicate that the content is of the audio type "music," that the content is not lead-in content (such as a countdown or other tone used to indicate the start of other content), and that the content (e.g., a song) does not support multiple instances. Additionally, metadata may be used to indicate that the visual type of the content is "visual support," as the content may be primarily audio-based with a display showing album artwork for the music.

Similarly, the Live News/Sports Video may be associated with metadata describing attributes of the live news/sports video content. For example, the live news/sports video content may be associated with metadata indicating that the content is not pausable (e.g., an indicator bit or bits indicating that the content is pausable). Additionally, metadata may be used to indicate that the content is of the audio type "tones/speech+tones," that the content is not lead-in content (such as a countdown or other tone used to indicate the start of other content), and that the content (e.g., a video of a sporting event) does not support multiple instances. Metadata may also be used to indicate that the content is live content. Additionally, metadata may be used to indicate that the visual type of the content is "visually dominant," as the content may be primarily visual-based (e.g., a video broadcast of the news/sports video).

The audiobook content may be associated with metadata describing attributes of the audiobook. For example, the audiobook content may be associated with metadata indicating that the content is pausable (e.g., an indicator bit or bits indicating that the content is a pausable audiobook). Additionally, metadata may be used to indicate that the content is of the audio type "Audiobook," that the content is not lead-in content (such as a countdown or other tone used to indicate the start of other content), and that the content (e.g., a reading of an audiobook) does not support multiple instances. Metadata may also be used to indicate that the content is not live content. Additionally, metadata may be used to indicate that the visual type of the content is "None," as the content may have no visual component, in the example.

Although various content types are depicted in FIG. 15, it should be appreciated that the techniques described herein are not limited to such content types and other content types may be used according to the particular implementation. Similarly, although various metadata describing various attributes of the content are described, other metadata and/or other attributes may be used to determine an interruption experience (e.g., the resulting output configuration of a speech processing-enabled device when incoming content is received while the device is executing existing content).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, from a speech processing-enabled device, first metadata indicating that existing content being output by the speech processing-enabled device comprises a video with synchronized audio;
   receiving incoming content for output by the speech processing-enabled device while the speech processing-enabled device is outputting the existing content;
   receiving second metadata indicating that the incoming content comprises a scheduled notification that is classified by the second metadata as visually dominant content;
   determining a plurality of decisions using at least the first metadata and the second metadata, the plurality of decisions comprising:
      determining, from the second metadata, that the incoming content comprises a visual component and an audio component;
      determining, from the first metadata and the second metadata, that the existing content is of a different type from the incoming content;
      determining, from the first metadata, that the existing content comprises video;
      determining, from the second metadata, that the incoming content is classified as visually dominant;
      determining, from the second metadata, that the incoming content is scheduled;
      determining to display the incoming content on a first portion of a display of the speech processing-enabled device; and
      determining to continue video playback of the existing content on at least a second portion of the display of the speech processing-enabled device; and
   sending a first command to the speech processing-enabled device effective to cause the speech processing-enabled device to display the incoming content on the first portion of the display and continue video playback of the existing content on at least the second portion of the display.

2. The method of claim 1, further comprising:
determining third metadata indicating that the existing content is capable of being paused during execution of second incoming content comprising a video call; and
sending a second command to the speech processing-enabled device effective to cause the speech processing-enabled device to pause the existing content during execution of the second incoming content.

3. The method of claim 1, further comprising:
determining, from the first metadata, that an indicator light of the speech processing-enabled device is in use;
determining, from the first metadata, that the existing content ceases execution after playback completion; and
sending a second command to the speech processing-enabled device effective to cause the speech processing-enabled device to control the indicator light in accordance with an indicator light modality of the incoming content.

4. A method comprising:
determining first metadata indicating that first content is being output by a speech processing-enabled device, the first metadata comprising one or more first attribute values related to at least one of audio characteristics or visual characteristics of the first content;
receiving, by the speech processing-enabled device, a first command to output second content, wherein the first command is received while the speech processing-enabled device is executing the first content;
determining second metadata comprising one or more second attribute values related to at least one of audio characteristics or visual characteristics of the second content;
determining third metadata indicating that the first content is pausable;
determining a first audio output configuration from among a plurality of audio output configurations for the speech processing-enabled device based at least in part on the one or more first attribute values, the one or more second attribute values, and the third metadata;
determining a first visual output configuration from among a plurality of visual output configurations for the speech processing-enabled device based at least in part on the one or more first attribute values, the one or more second attribute values, and the third metadata; and
sending the first audio output configuration and the first visual output configuration to the speech processing-enabled device.

5. The method of claim 4, further comprising:
determining, from the first metadata, a first visual type of the first content;
determining, from the second metadata, a second visual type of the second content; and
determining the first visual output configuration based on the first visual type and the second visual type, wherein the first visual output configuration is effective to configure a visual output of the speech processing-enabled device during execution of the second content.

6. The method of claim 4, further comprising:
determining, from the first metadata and the second metadata, that a first audio type of the first content is different from a second audio type of the second content; and
determining the first audio output configuration or the first visual output configuration based at least in part on a determination that the first audio type is different from the second audio type.

7. The method of claim 4, further comprising:
determining that the speech processing-enabled device comprises a display;
determining that the second metadata indicates that the second content is classified as visual only content;
determining that the first metadata indicates that the first content is classified as visual only content; and
determining the first visual output configuration based on the first metadata and the second metadata, wherein the first visual output configuration is effective to configure a visual output of the speech processing-enabled device during execution of the second content.

8. The method of claim 4, further comprising:
determining from the first metadata that the first content comprises music;
sending a second command for the speech processing-enabled device to attenuate a volume of the first content from a first volume level to a second volume level during execution of the second content; and
sending a third command for the speech processing-enabled device to increase the volume of the first content after execution of the second content has completed.

9. The method of claim 4, further comprising:
determining, from the second metadata, that the second content is classified as at least one of visual only or visually dominant; and
sending a second command to the speech processing-enabled device to display the second content on a first portion of a display of the speech processing-enabled device while displaying the first content on a second portion of the display of the speech processing-enabled device.

10. The method of claim 4, wherein the speech processing-enabled device is a first speech processing-enabled device, the method further comprising:
determining that a user interacted with a second speech processing-enabled device more recently than with the first speech processing-enabled device; and
sending the second content to the second speech processing-enabled device based on the user interacting with the second speech processing-enabled device more recently than with the first speech processing-enabled device.

11. The method of claim 4, wherein the speech processing-enabled device is a first speech processing-enabled device, the method further comprising:
determining, from the second metadata, that the second content comprises visual content;
determining, from among a plurality of other speech processing-enabled devices communicating on local area network with the first speech processing-enabled device, a second speech processing-enabled device comprising a display effective to display video; and
sending a second command to the second speech processing-enabled device, the second command effective to cause the second speech processing-enabled device to execute the second content based at least in part on the second speech processing-enabled device including a display.

12. The method of claim 4, further comprising:
determining one or more perceivable attributes of the first content; and determining one or more perceivable attributes of the second content.

13. A system comprising:
at least one processor; and
at least one non-transitory computer-readable memory comprising instructions that, when executed by the at least one processor, are effective to program the at least one processor to:
determine first metadata indicating that first content is being output by a speech processing-enabled device, the first metadata comprising one or more first attribute values related to at least one of audio characteristics or visual characteristics of the first content;
receive, by the speech processing-enabled device, a first command to output second content, wherein the first command is received while the speech processing-enabled device is executing the first content;
determine second metadata comprising one or more second attribute values related to at least one of audio characteristics or visual characteristics of the second content;
determine third metadata indicating that the first content is pausable;
determine a first audio output configuration from among a plurality of audio output configurations for the speech processing-enabled device based at least in part on the one or more first attribute values, the one or more second attribute values, and the third metadata;
determine a first visual output configuration from among a plurality of visual output configurations for the speech processing-enabled device based at least in part on the one or more first attribute values, the one or more second attribute values, and the third metadata; and
send the first audio output configuration and the first visual output configuration to the speech processing-enabled device.

14. The system of claim 13, the at least one non-transitory computer-readable memory storing further instructions that, when executed by the at least one processor, are further effective to program the at least one processor to:
determine, from the first metadata, a first visual type of the first content;
determine, from the second metadata, a second visual type of the second content; and
determine the first visual output configuration based on the first visual type and the second visual type, wherein the first visual output configuration is effective to configure a visual output of the speech processing-enabled device during execution of the second content.

15. The system of claim 13, the at least one non-transitory computer-readable memory storing further instructions that, when executed by the at least one processor, are further effective to program the at least one processor to:
determine, from the first metadata and the second metadata, that the first content is different from the second content; and determine the first audio output configuration or the first visual output configuration based at least in part on a determination that the first content is different from the second content.

16. The system of claim 13, the at least one non-transitory computer-readable memory storing further instructions that, when executed by the at least one processor, are further effective to program the at least one processor to:
determine that the speech processing-enabled device comprises a display;
determine that the second metadata indicates that the second content is classified as visual only content;
determine that the first metadata indicates that the first content is classified as visual only content; and
determine the first visual output configuration based on the first metadata and the second metadata, wherein the first visual output configuration is effective to configure a visual output of the speech processing-enabled device during execution of the second content.

17. The system of claim 13, the at least one non-transitory computer-readable memory storing further instructions that, when executed by the at least one processor, are further effective to program the at least one processor to:
determine from the first metadata that the first content comprises music;
send a second command for the speech processing-enabled device to attenuate a volume of the first content from a first volume level to a second volume level during execution of the second content; and
send a third command for the speech processing-enabled device to increase the volume of the first content after execution of the second content has completed.

18. The system of claim 13, the at least one non-transitory computer-readable memory storing further instructions that, when executed by the at least one processor, are further effective to program the at least one processor to:
determining, from the second metadata, that the second content is classified as at least one of visual only or visually dominant; and
sending a second command to the speech processing-enabled device to display the second content on a first portion of a display of the speech processing-enabled device while displaying the first content on a second portion of the display.

19. The system of claim 13, wherein the speech processing-enabled device is a first speech processing-enabled device and wherein the at least one non-transitory computer-readable memory storing further instructions that, when executed by the at least one processor, are further effective to program the at least one processor to:
determine that a user interacted with a second speech processing-enabled device more recently than with the first speech processing-enabled device; and
send the second content to the second speech processing-enabled device based on the user interacting with the second speech processing-enabled device more recently than with the first speech processing-enabled device.

* * * * *